(12) United States Patent
Faber

(10) Patent No.: US 12,116,148 B2
(45) Date of Patent: Oct. 15, 2024

(54) SYSTEMS AND METHODS FOR DELIVERING, STORING, AND PROCESSING MATERIALS IN SPACE

(71) Applicant: Orbit Fab, Inc., Santa Clara, CA (US)

(72) Inventor: Daniel Faber, Westminster, CO (US)

(73) Assignee: Orbit Fab, Inc., Lafayette, CO (US)

( * ) Notice: Subject to any disclaimer, the term of this patent is extended or adjusted under 35 U.S.C. 154(b) by 61 days.

(21) Appl. No.: 17/731,030

(22) Filed: Apr. 27, 2022

(65) Prior Publication Data

US 2022/0371749 A1 Nov. 24, 2022

Related U.S. Application Data

(63) Continuation of application No. 16/126,882, filed on Sep. 10, 2018, now Pat. No. 11,358,739.

(Continued)

(51) Int. Cl.
| | | |
|---|---|---|
| *B64G 1/10* | (2006.01) | |
| *B64G 1/24* | (2006.01) | |
| *B64G 1/64* | (2006.01) | |

(52) U.S. Cl.
CPC ......... *B64G 1/1078* (2013.01); *B64G 1/2427* (2023.08); *B64G 1/641* (2013.01); *B64G 1/646* (2013.01)

(58) Field of Classification Search
CPC .... B64G 1/1078; B64G 1/2427; B64G 1/641; B64G 1/646; B64G 1/26; B64G 1/286;

(Continued)

(56) References Cited

U.S. PATENT DOCUMENTS

| | | |
|---|---|---|
| 3,144,219 A | 8/1964 | Schnitzer |
| 3,700,193 A | 10/1972 | Bradley |

(Continued)

FOREIGN PATENT DOCUMENTS

| | | | |
|---|---|---|---|
| CA | 2473981 C | * 11/2012 | ............. B64G 1/646 |
| CA | 3132561 A1 | * 9/2020 | ............. B64G 1/646 |

(Continued)

OTHER PUBLICATIONS

International Search Report and Written Opinion for International Patent Application No. PCT/US18/50286, Applicant: Orbit Fab, Inc., Mailed Jan. 29, 2019, 24 pages.

(Continued)

*Primary Examiner* — Valentina Xavier
(74) *Attorney, Agent, or Firm* — Perkins Coie LLP

(57) ABSTRACT

Systems and methods for transferring, storing, and/or processing materials, such as fuel or propellant, in space, are disclosed. A representative system includes a flexible container that is changeable between a stowed configuration in which the flexible container is contained within a satellite, and a deployed configuration in which the flexible container extends away from the satellite. The system can include a tanker with a storage container to dock with and refuel a satellite. Another representative system includes a controller programmed with instructions that position a spacecraft with a storage container in a first orbit, transfer the spacecraft to a second orbit, dock the spacecraft with a satellite in the second orbit, transfer material between the storage container and the satellite, undock the spacecraft from the satellite, and, optionally, return the spacecraft to the first orbit. An androgynous coupling system with mechanical and fluid connectors facilitates docking and material transfer.

14 Claims, 17 Drawing Sheets

Related U.S. Application Data

(60) Provisional application No. 62/614,835, filed on Jan. 8, 2018, provisional application No. 62/595,238, filed on Dec. 6, 2017, provisional application No. 62/556,468, filed on Sep. 10, 2017.

(58) Field of Classification Search
CPC .......... B64G 1/36; B64G 1/361; B64G 1/363; B64G 1/54; B64G 1/402; B64G 1/242; B64G 1/366; B64G 1/62; B64G 1/68
See application file for complete search history.

(56) References Cited

U.S. PATENT DOCUMENTS

| | | | |
|---|---|---|---|
| 3,827,599 | A | 8/1974 | Rastogi |
| 3,854,905 | A | 12/1974 | Balzer |
| 3,931,834 | A | 1/1976 | Caillet |
| 4,451,017 | A | 5/1984 | Marshall |
| 4,471,926 | A | 9/1984 | Steel |
| 4,489,745 | A | 12/1984 | Netter |
| 4,705,546 | A | 11/1987 | Bruns |
| 4,728,061 | A | 3/1988 | Johnson et al. |
| 4,741,502 | A | 5/1988 | Rosen |
| 4,796,839 | A | 1/1989 | Davis |
| 4,872,625 | A | 10/1989 | Filley |
| 4,903,919 | A | 2/1990 | Johnson |
| 5,145,130 | A * | 9/1992 | Purves .................. B64G 1/646  901/1 |
| 5,202,165 | A | 4/1993 | Lusignea |
| 5,217,187 | A | 6/1993 | Criswell |
| 5,299,764 | A | 4/1994 | Scott |
| 5,427,334 | A | 6/1995 | Rauscher, Jr. |
| 5,545,841 | A | 8/1996 | Wilifinger |
| 5,778,679 | A | 7/1998 | Celorier, Jr. |
| 5,913,451 | A | 6/1999 | Madison |
| 5,920,294 | A | 7/1999 | Allen |
| 5,979,481 | A | 11/1999 | Ayresman |
| 6,193,193 | B1 | 2/2001 | Soranno et al. |
| 6,231,010 | B1 | 5/2001 | Schneider et al. |
| 6,264,144 | B1 | 7/2001 | Thorton |
| 6,275,751 | B1 | 8/2001 | Stallard et al. |
| 6,290,820 | B1 | 9/2001 | Carden |
| 6,293,500 | B1 | 9/2001 | Bigelow |
| 6,393,675 | B1 | 5/2002 | Gaetke |
| 6,439,508 | B1 | 8/2002 | Taylor |
| 6,514,889 | B1 | 2/2003 | Theoret et al. |
| 6,523,402 | B1 | 2/2003 | Hall et al. |
| 6,669,148 | B2 | 12/2003 | Andereman et al. |
| 7,070,151 | B2 | 7/2006 | D'Ausolio et al. |
| 7,114,682 | B1 | 10/2006 | Kistler et al. |
| 7,392,964 | B1 | 7/2008 | Anderman |
| 7,413,148 | B2 | 8/2008 | Behrens et al. |
| 7,559,508 | B1 | 7/2009 | Taylor et al. |
| 7,559,509 | B1 | 7/2009 | Kistler et al. |
| 7,575,200 | B2 | 8/2009 | Behrens et al. |
| 7,669,804 | B2 | 3/2010 | Strack et al. |
| 7,861,884 | B2 | 1/2011 | Childress |
| 7,861,975 | B2 | 1/2011 | Behrens et al. |
| 8,006,937 | B1 | 8/2011 | Romano et al. |
| 8,820,353 | B2 | 9/2014 | Yandle et al. |
| 8,899,527 | B2 | 12/2014 | Allen et al. |
| 9,056,676 | B1 | 6/2015 | Wang |
| 9,231,323 | B1 * | 1/2016 | Jaeger .................. F16L 37/002 |
| 9,302,793 | B2 | 4/2016 | Ghofranian et al. |
| 9,439,092 | B1 | 9/2016 | Chukka |
| 9,613,539 | B1 | 4/2017 | Lindskog et al. |
| 9,718,564 | B1 | 8/2017 | Beckman |
| 10,106,029 | B2 | 10/2018 | Aso |
| 10,211,674 | B1 | 2/2019 | Leabman |
| 10,302,053 | B2 | 5/2019 | Aso |
| 10,308,125 | B2 | 6/2019 | Ahrens |
| 10,513,352 | B2 | 12/2019 | Poncet et al. |
| 10,577,133 | B2 | 3/2020 | White, Jr. |
| 10,604,281 | B2 | 3/2020 | Raven et al. |
| 10,654,584 | B2 | 5/2020 | Bosma |
| 10,807,782 | B2 | 10/2020 | Snafilippo |
| 10,822,155 | B2 | 11/2020 | Khomenko |
| 10,850,869 | B2 | 12/2020 | Nicholson et al. |
| 11,273,932 | B2 | 3/2022 | Faber |
| 11,358,739 | B2 | 6/2022 | Faber |
| 11,530,053 | B2 | 12/2022 | Wingo et al. |
| 2002/0047016 | A1 | 4/2002 | Ishikawa |
| 2002/0092854 | A1 | 7/2002 | Aaron |
| 2002/0179775 | A1 * | 12/2002 | Turner .................. B64G 1/402  244/172.5 |
| 2003/0029969 | A1 | 2/2003 | Turner |
| 2004/0026571 | A1 | 2/2004 | Scott |
| 2004/0031885 | A1 | 2/2004 | D'Ausilio et al. |
| 2005/0017016 | A1 | 1/2005 | Lombari |
| 2006/0145023 | A1 | 7/2006 | Babb et al. |
| 2006/0145024 | A1 | 7/2006 | Kosmas |
| 2006/0278765 | A1 | 12/2006 | Strack et al. |
| 2007/0051854 | A1 | 3/2007 | Behrens et al. |
| 2007/0228219 | A1 | 10/2007 | Behrens et al. |
| 2007/0228220 | A1 | 10/2007 | Behrens |
| 2008/0087769 | A1 | 4/2008 | Johnson |
| 2008/0121759 | A1 | 5/2008 | Behrens et al. |
| 2009/0173833 | A1 | 7/2009 | Ritter et al. |
| 2010/0006704 | A1 | 1/2010 | Sainct |
| 2012/0000575 | A1 | 1/2012 | Yandle et al. |
| 2012/0080438 | A1 | 4/2012 | Beretta |
| 2012/0097532 | A1 | 4/2012 | DeLuze |
| 2012/0292449 | A1 | 11/2012 | Levin et al. |
| 2013/0119204 | A1 | 5/2013 | Allen et al. |
| 2014/0348140 | A1 | 11/2014 | Atkinson |
| 2015/0236778 | A1 | 8/2015 | Jalali |
| 2016/0207641 | A1 | 7/2016 | Myers |
| 2016/0257432 | A1 | 9/2016 | Shmueli |
| 2016/0361992 | A1 | 12/2016 | Aso |
| 2016/0364989 | A1 | 12/2016 | Speasl et al. |
| 2017/0173451 | A1 | 6/2017 | Pedersen |
| 2018/0086456 | A1 | 3/2018 | Burch et al. |
| 2018/0098780 | A1 | 4/2018 | Melton et al. |
| 2019/0023420 | A1 * | 1/2019 | Nicholson ............. B64G 1/648 |
| 2019/0023422 | A1 * | 1/2019 | Nicholson ............. B64G 1/402 |
| 2019/0077523 | A1 | 3/2019 | Faber et al. |
| 2019/0077524 | A1 | 3/2019 | Faber et al. |
| 2019/0135456 | A1 * | 5/2019 | Wingo .................. B64G 1/646 |
| 2019/0247050 | A1 * | 8/2019 | Goldsmith ............... A61F 2/82 |
| 2020/0049114 | A1 | 2/2020 | O'Connor |
| 2020/0346781 | A1 | 11/2020 | Bosma |
| 2021/0061494 | A1 * | 3/2021 | Belieres Montero .. B64G 1/002 |
| 2021/0070465 | A1 | 3/2021 | Bosma |
| 2021/0086923 | A1 * | 3/2021 | Halsband ............. B64G 1/1078 |
| 2021/0300597 | A1 * | 9/2021 | Clark .................... B64G 1/402 |
| 2022/0259746 | A1 | 8/2022 | Wang et al. |
| 2023/0365275 | A1 * | 11/2023 | Nicholson ............... B64G 1/40 |

FOREIGN PATENT DOCUMENTS

| | | |
|---|---|---|
| CN | 201445801 | 5/2010 |
| DE | 4242977 | 6/1994 |
| DE | 102011009952 | 8/2012 |
| EP | 2143640 | 1/2010 |
| GB | 2264684 | 9/1993 |
| WO | 2008066512 | 6/2008 |
| WO | 2014021741 | 2/2014 |
| WO | 2016020390 | 2/2016 |
| WO | 2019051423 | 3/2019 |
| WO | 2019051432 | 3/2019 |

OTHER PUBLICATIONS

ResearchGate.net, "Analysis of a hybrid genetic simulated annealing strategy applied in multi-objective optimization of orbital maneuvers," https://www.researchgate.net/figure/LEO-GTO-and-GEO-trajectories_fig10_315689898, Mar. 22, 2017, 1 page.

Cubesat—California Polytechnic State University, 6U CubeSat Design Specification Revision 1.0 (CP-6UCDS-1.0) The CubeStat Program, Cal Poly SLO, accessed Feb. 2019, 27 pages.

(56) References Cited

OTHER PUBLICATIONS

Cubesat—California Polytechnic State University, "CubeSat Design Specification (CDS) Rev 13," The CubeStat Program, Cal Poly SLO, accessed Feb. 2019, 42 pages.

National Aeronautics and Space Administration (NASA), "CubeSat 101—Basic Concept and Processes for First Time CubeSat Developers," NASA CubeSat LaunchInitiative, revision Oct. 2017, 96 pages.

Inflatable Emergency Atmospheric-Entry Vehicles, Tech Briefs Engineering Solutions for Design and Manufacturing, Aug. 1, 2004, 4 pages.

Faa, "Maneuvering In Space 4.1.5." available at: https://web.archive.org/web/20170613043041/https://www.faa.gov/about/office_org/headquarters_offices/avs/offices/aam/cami/library/online_libraries/aerospace_medicine/tutorial/media/III.4.1.5_Maneuvering_in_Space.pdf, 2017 pages, 32 pages.

Shirazi, "Analysis of a Hybrid Genetic Simulated Annealing Strategy Applied in Multi-Objective Optimization of Orbital Maneuvers," IEEE A&E Systems Magazine, Jan. 2017, 17 pages.

Dancila, "A MEMS variable Faraday cage as tuning element for integrated silicon micromachines cavity resonators," IEEE International Conference on Micro Electro Mechanical Systems (MEMS), Feb. 2010, 5 pages.

Invitation to Pay Additional Fees and, Where Applicable, Protest Fee for International Patent Application No. PCT/US18/50286, Applicant: Orbit Fab, Inc., Nov. 6, 2018, 3 pages.

Invitation to Pay Additional Fees and, Where Applicable, Protest Fee for International Patent Application No. PCT/US18/50309, Applicant: Space Arena, Inc., Nov. 21, 2018, 2 pages.

Valle et al., "Review of Habitable Softgoods Inflatable Design, Analysis, Testing, and Potential Space Applications," American Institute of Aeronautics and Astronautics, available at: https://ntrs.nasa.gov/citations/20190000847, published: Jan. 7, 2019, 15 pages.

Extended European Search Report and Written Opinion for European Patent Application No. 18853997.7, Applicant: Orbit Fab, Inc., mailed May 27, 2021, 10 pages.

Extended European Search Report for European Patent Application No. 23169671.7, Applicant: Orbit Fab, Inc., mailed Aug. 2, 2023, 8 pages.

Aldred, John, "There's A Drone Flying Around the International Space Station—and It's Adorable," https://www.diyphotography.net/theres-drone-flying-around-international-space-station-adorable/, 2006-2023, 11 pages.

NASA—National Aeronautics and Space Administration, "Reference Guide to the International Space Station," Utilization Edition, Sep. 2015, 116 pages.

\* cited by examiner

SYSTEMS AND METHODS FOR DELIVERING, STORING, AND PROCESSING MATERIALS IN SPACE

CROSS-REFERENCE TO RELATED APPLICATIONS

The present application is a continuation of U.S. patent application Ser. No. 16/126,882, filed Sep. 10, 2018, now issued as U.S. Pat. No. 11,358,739, which claims priority to U.S. Provisional Patent Application No. 62/614,835, filed Jan. 8, 2018, U.S. Provisional Patent Application No. 62/595,238, filed Dec. 6, 2017, and U.S. Provisional Patent Application No. 62/556,468, filed Sep. 10, 2017, each of which is incorporated herein in its entirety by reference.

TECHNICAL FIELD

The present disclosure is directed generally to systems and methods for delivering, storing, and processing materials in space. Representative aspects of the present disclosure include space systems, fuel or propellant storage, and fuel processing.

BACKGROUND

Existing space systems include several drawbacks. For example, launch vehicles may have limited volume and mass capacities. Spacecraft, such as satellites and/or other machines for traveling in space, are often launched to orbit with a limited quantity of fuel on board due to size and/or cost restrictions that must be compromised when designing the spacecraft for a particular mission. Accordingly, space missions may have limited lifetimes and/or utility due to limited fuel. Likewise, features and functions of spacecraft, such as the type and quantity of payload the spacecraft itself may carry, may be limited and/or compromised because the spacecraft may need to be launched full of all of the fuel it will need for its entire lifetime.

Refueling a satellite is difficult or impossible with existing systems. For example, existing docking systems and procedures are complicated and two satellites or vehicles may have incompatible docking systems or no docking systems. There is a need for systems and methods for delivering, storing, and processing materials in space that overcome these disadvantages of existing space systems.

DETAILED DESCRIPTION

Figure 1:
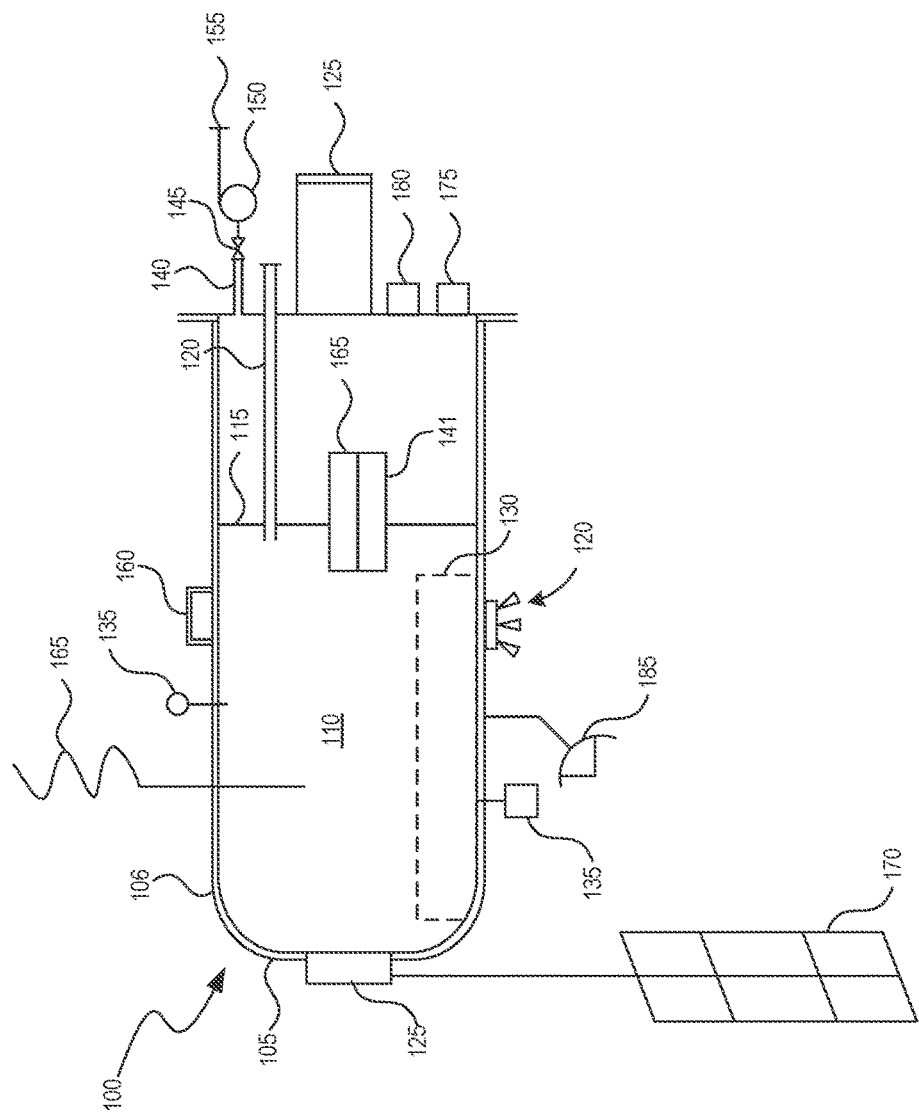
FIG. 1 illustrates a partially schematic view of a spacecraft configured to transport, deliver, store, and/or process materials in accordance with embodiments of the present technology.

Several embodiments of the present technology are directed to systems and methods for delivering, storing, and/or processing materials (e.g., liquids, gases, solids, and/or other materials) in space. Any of the features described herein can be combined in suitable manners with any of the other features described herein without deviating from the scope of the present technology.

Many specific details of some embodiments of the technology are set forth in the following description and FIGS. 1-17 to provide a thorough understanding of these embodiments. Well-known structures, systems, and methods that are often associated with such embodiments, but that may unnecessarily obscure some significant aspects of the disclosure, are not set forth in the following description for purposes of clarity. Moreover, although the following disclosure sets forth some embodiments of the technology, some embodiments of the technology can have different configurations and/or different components than those described in this section. As such, the technology can include embodiments with additional elements, and/or without several of the elements described below with reference to FIGS. 1-17.

Many embodiments of the technology described below may take the form of computer- or controller-executable instructions, including routines executed by a programmable computer or controller. Those skilled in the relevant art will appreciate that the technology can be practiced on computer/ controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multiprocessor systems, processor-based or programmable consumer electronics, network computers, mini computers and the like). Information handled by these computers can be presented at any suitable display medium, including an LCD.

The technology can also be practiced in distributed environments, where tasks or modules are performed by remote processing devices that are linked through a communications network. In a distributed computing environment, program modules and/or subroutines may be located in local and remote memory storage devices. Aspects of the technology described below may be stored and/or distributed on computer-readable media, including magnetic or optically readable or removable computer disks, as well as distributed electronically over networks. Data structures and transmissions of data particular to aspects of the technology are also encompassed within the scope of the embodiments of the technology.

Reference is made herein to "space." Space includes orbital space near or around Earth, the Moon, or another planetary body. A person of ordinary skill in the art will also recognize that embodiments of the present technology can be implemented on a planetary or lunar surface, or on another surface. Reference is also made to fuel or propellant. A person of ordinary skill in the art will understand that the terms fuel and propellant can be used interchangeably when referring to a substance for powering and/or propelling a spacecraft, and can include oxidizers that function as propellant when combined with fuels. In addition, a person of ordinary skill in the art will understand that a spacecraft can include any human-made object in space.

A. System Overview

The present disclosure describes environments, facilities, systems, and/or devices such as spacecraft configured to transport, deliver, store, and process fluids (such as fuel or propellant) and other materials in an extraterrestrial environment, such as in space or on extraterrestrial bodies such as moons or asteroids. Activities performed by spacecraft disclosed herein can be autonomous, semi-autonomous, or non-autonomous, and can include assistance by robots, artificial intelligence, and/or humans.

Several of the spacecraft according to embodiments of the present technology include tankers and satellites that have containers for receiving and/or storing materials such as liquids, gases, and/or other materials. The present technology also includes coupling systems for connecting spacecraft to each other, such as in a rendezvous and/or docking maneuver. Coupling systems also facilitate transfer of materials, data, power, and other elements. In some embodiments, the spacecraft and systems described herein can be used to sell fuel or propellant to customers as part of a satellite refueling arrangement, which can extend the lifetime of spacecraft and other satellites, as well as improve capabilities of spacecraft missions. In other words, embodiments of the present technology can function as orbiting "gas stations" or "propellant stations."

B. Depots, Tankers, and Tanks

FIG. 1 illustrates a partially schematic view of a spacecraft configured to transport, deliver, store, and/or process materials in accordance with embodiments of the present technology. The spacecraft in FIG. 1 can alternatively be referred to as a tanker or a fuel depot. The spacecraft 100 can include a storage container 105 for holding materials in an enclosed interior volume 110 within the storage container 105. The storage container 105—and consequently, the enclosed interior volume 110—can be divided into portions by one or more internal bulkheads 115. The spacecraft 100 can optionally include one or more propulsion systems 120 suitable for facilitating orbit transfers, stationkeeping, pointing, and/or other orbital navigation operations. Propulsion systems 120 can be positioned at any suitable location on the spacecraft 100. Propulsion systems 120 can include rocket engines, electric thrusters, and/or other suitable space propulsion systems.

The spacecraft 100 can include one or more coupling structures 125 positioned on a suitable exterior surface of the spacecraft 100. Coupling structures, which can be androgynous such that two identical or similar coupling structures can connect to each other, are described in additional detail below. In some embodiments, coupling structures 125 can provide mechanical docking capability to dock with other spacecraft. In some embodiments, coupling structures 125 can include an airlock, fluid connectors, electrical connectors, and/or other connectors for transferring signals, electricity, cargo, passengers, fluid, and/or other materials between the spacecraft 100 and other spacecraft. Coupling structures 125 can include windows for viewing the environment outside the spacecraft 100, bumpers to absorb shock during a docking process, and/or physical guides or guiderails to align the coupling structures 125 to corresponding coupling structures on other spacecraft. Coupling structures 125 can include doors and/or openings to function as access ports for human and/or robotic access.

In some embodiments, the container 105 can be formed with one or more solid or flexible walls 106 that may or may not be pressurized. For example, the container 105 can be pressurized at or below approximately 1 atmosphere, or it can be pressurized at other pressure levels. The walls 106 of the container 105 can be internally and/or externally supported with suitable trusses, beams, tubes, and/or other structures suitable for supporting the container 105 so that it forms the enclosed interior volume 110. The walls can be impermeable (to hold liquid and/or gas), or they can have openings (such that it is formed as a mesh or net) to hold solid objects. Walls can be made with any material suitable for providing structural support and/or reinforcement in a space environment, such as aluminum, steel, and/or composite material (for example, carbon fiber, fiberglass, or carbon-carbon material). The walls 106 of the container 105 can have a honeycomb structure, multiple layers (for example, thermal insulation, radiation insulation, micrometeorite shielding, Whipple shield, sunshield), and/or other structures suitable for holding a shape of the container 105. Selected layers of the walls 106 can completely surround the spacecraft 100 and/or the container 105, or they can be positioned only partially around portions of the spacecraft 100 and/or the container 105.

In some embodiments, elements of the spacecraft 100 and/or the container 105 can be positioned between layers of the wall 106 of the container 105, (e.g., electrical cables, thermal conductors, data cables, and/or other elements). The spacecraft 100 can be coated and/or covered in whole or in part with a thermally radiative material. An overall shape of the spacecraft 100 and/or the container 105 can have straight edges, or it can have one or more curved ends, which can facilitate stress management when the container 105 is pressurized. An exo-skeletal structure or frame can be positioned around the container 105 for additional structural support, and such a frame can be flexible or rigid.

The bulkhead 115 can be insulated to separate materials of different temperatures in the interior volume 110. In some embodiments, it can be structurally configured to accommodate pressure on one or both sides. For example, it can include reinforcing structural members and/or it can be formed with a strong rigid or flexible material. The bulkhead 115 can include windows for permitting viewing between portions of the interior volume 110 and/or it can have openings or pass-throughs to allow power, data, heat, fluids, and/or other materials to pass therethrough.

The container 105 and the spacecraft 100 can be configured to withstand a rocket launch or a high-gravitational force launch such as a launch provided by a gas gun, a powder gun, or a slingshot. In some embodiments, the container 105 and/or the spacecraft 100, or portions thereof, can be held in a potting material (e.g., a resin or a dense liquid) to limit damage (such as components shearing off) during a high-acceleration launch. Such a potting material can be permanent or removable (for example, it can be jettisoned when the spacecraft reaches orbit.

In general, the container 105 is a container for receiving, storing, and distributing materials such as fuel or another propellant (e.g., an oxidizer or oxidant). In some embodiments, the spacecraft 100 and/or the container 105 can include a re-purposed and refurbished launch vehicle upper stage, such as a re-purposed rocket fuel tank or booster tank. The spacecraft 100 can be oriented to have a small cross-section in the orbital vector and a relatively long body along the orbit vector to reduce drag. In some embodiments, the longest axis of a spacecraft 100 can be oriented tangential to its orbit to reduce drag. In some embodiments, the container 105 can include one or more internal baffles 130 to dampen vibrations and/or to assist with moving fuel or other matter to inputs and/or outputs.

The spacecraft 100 can include one or more sensors 135 positioned inside and/or outside of the container 105. The sensors 135 can include sensors for monitoring health of the spacecraft 100, the environment around the spacecraft 100, and/or characteristics of the container 105 and material therein. For example, sensors 135 can detect gamma-rays, neutrons, electro-magnetic radiation, temperature, vibration, pressure, altitude, attitude, position, and/or relative position to nearby objects, for example. Internal sensors 135 can also sense properties of material stored in the container 105, such as composition, electrical conductivity, mass distribution, mass properties, chemical distribution, and/or other characteristics. In some embodiments, sensors 135 can be self-powered with solar panels, thermal difference power generators, piezoelectric generators, and/or other power generation systems.

The spacecraft 100 can include one or more pipes 141 for providing input and output to the container 105, and associated valves 145 and/or pumps 150 for controlling flow and/or for functioning as expulsion devices to push material out of the container 105. Pipes 141 can also transfer material between portions of the enclosed volume 110 (for example, through the bulkhead 115). The ends of exterior pipes 140 can include coupling systems to receive and/or transfer fluid, such as fuel to be transferred to or from another spacecraft. The ends of the exterior pipes 140 can also include connection interfaces for electrical, data, thermal, and mechanical linkages. In some embodiments, pipes can include metering systems 155 to measure fluid flow, and such metering systems 155 can be connected to a billing system to charge customers for an amount of fuel transferred to another spacecraft.

In some embodiments, the spacecraft 100 can include one or more attachment points 160 for mechanical attachment to equipment (such as sensors or actuators) or other spacecraft. In some embodiments, attachment points can include hooks, latches, bolts, straps, hook-and-loop fasteners, rails, magnets, adhesives, and/or other elements suitable for attaching objects to each other. In some embodiments, the attachment points 160 can facilitate attachment of multiple spacecrafts 100 together (or multiple containers 105).

In some embodiments, the spacecraft 100 can include thermal radiation or thermal transfer systems 165 to conduct heat between portions of the enclosed interior volume 110 or from the interior volume 110 to an exterior of the spacecraft 100 or the container 105. One or more solar arrays 170 can extend from the spacecraft 100, such as with a boom and/or other structure, and/or solar arrays can be flush against the spacecraft 100. The solar arrays 170 can provide power for the spacecraft 100, which can be stored in and distributed from one or more batteries 175.

The spacecraft 100 can include a computer system 180 to control functions of the spacecraft 100, including avionics, guidance, control, navigation, communication, docking, fluid transfer, monitoring, and other aspects of space flight operations. In some embodiments, the computer system 180 can include artificial intelligence and/or autonomous decision-making to automatically dock with other spacecraft to transfer or receive fuel and/or other material. The spacecraft 100 can also carry a communications system 185, which can include communications devices such as radios and antennas to communicate voice, data, and/or video with other satellites, spacecraft, and/or with Earth, for example.

In some embodiments, the spacecraft 100 can be implemented as a stationary depot and it can be parked in a parking orbit until it travels to another spacecraft, or another spacecraft travels to the spacecraft 100. In some embodiments, the spacecraft 100 can spin and/or rotate the container 105, or the entire spacecraft 100 can use thrusters 120 and/or other forces to spin or rotate, for example, to provide centripetal forces.

Other subsystems that can be implemented in the spacecraft 100 include facilities to process materials, for example, creating or breaking down fuel, propellants, and/or other materials. Subsystems can include chemical conversion by catalysis, electrolysis, heating, cooling, fluid agitation, and/or other processes. Subsystems can be powered and/or heated with a solar concentrator or other suitable power or heat sources. Subsystems can be cooled with radiators. Subsystems can create the fuel or propellant for powering the spacecraft 100 or for storing in the container 105 for later distribution to other spacecraft.

In some embodiments, the spacecraft 100 can include a water processing system that separates water into hydrogen and oxygen (for example, by electrolysis or a proton exchange membrane) for use as fuel. In some embodiments, the water processing system can function in reverse to combine hydrogen and oxygen into water. In some embodiments, the spacecraft 100 can retrieve fuel, propellant, water, hydrogen, and/or oxygen from other spacecraft or portions of other spacecraft (such as the upper stages of one or more spacecraft, such as launch vehicles, after they have completed their launch, but which may have residual material in one or more tanks) for processing and then storage in the container 105. In some embodiments, the spacecraft 100 can include a hydrocarbon processing system that creates or breaks down hydrocarbons. For example, the spacecraft 100 can include containers 105 or portions of containers 105 that contain carbon dioxide and hydrogen to be combined into methane and water and stored in other containers 105 or portions of containers 105. Other organic components can be formed or broken down in the hydrocarbon processing system. Systems that handle multiple substances can include multiple containers 105 or a single container 105 can include multiple bulkheads 115 to divide the interior volume 110 into suitable portions.

Figure 2:
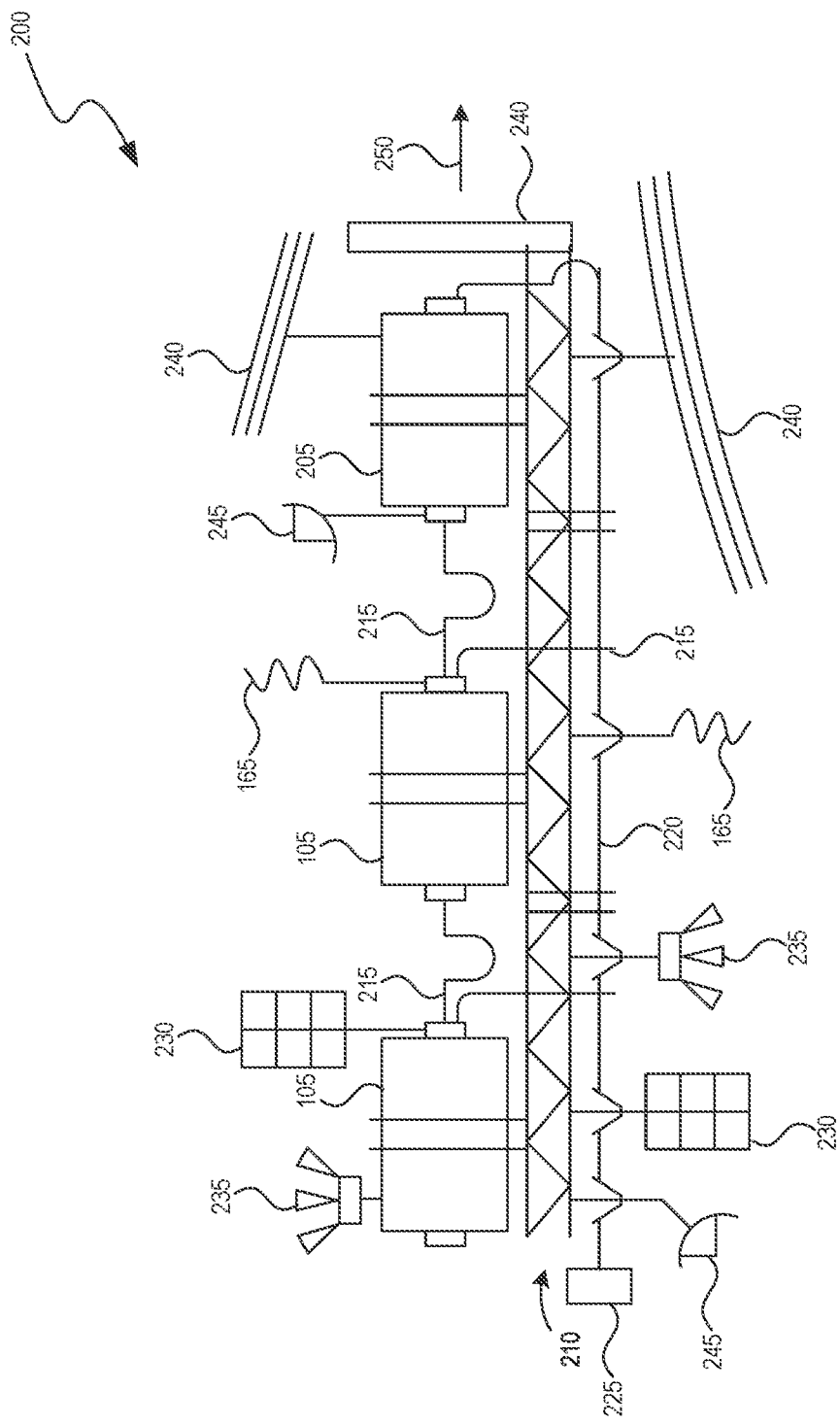
FIG. 2 illustrates a partially schematic view of a spacecraft configured to transport, deliver, store, and/or process materials in accordance with embodiments of the present technology.

FIG. 2 illustrates a partially schematic view of a spacecraft 200 in accordance with another embodiment of the present technology, configured to transport, deliver, store, and/or process materials. The spacecraft 200 can also be referred to as a tanker or a fuel depot. The spacecraft 200 can include a plurality of containers 105 and/or other subsystems 205 such as water processing systems, hydrocarbon processing systems, or other systems for processing materials for storage or distribution. The containers 105 and/or other subsystems 205 can be carried by one or more support structures, such as a truss 210. Containers 105 and/or other subsystems 205 can be connected to each other via plumbing, electrical, signal, and/or other connections 215. A manifold 220 can connect one or more of the containers 105 and/or other subsystems 205 to each other and to a common coupling structure 225, which can be similar to other coupling structures described herein. The coupling structure 225 can provide a connection point for other spacecraft to dock and transfer fluids with the spacecraft 200. In some embodiments, the spacecraft 200 can be formed by multiple spacecraft (such as the spacecraft 100 described above) coupling together either directly and/or via a support structure such as the truss 210.

The spacecraft can include other systems and subsystems, such as one or more solar arrays 230, one or more propulsion systems 235 (to provide thrust for stationkeeping, orbit maneuvering, rotation of the spacecraft 200, and/or other functions), shielding 240 (for micrometeoroids, radiation, and/or other hazards), communications systems 245 (for audio, video, and/or data transmission). In some embodiments, the spacecraft 200 can be oriented to have a smaller cross-sectional area facing its orbital velocity vector 250 to reduce or minimize drag.

In some embodiments, the tanker or depot 200 may wait in an orbit for other spacecraft (such as the spacecraft 100 described above, or another spacecraft such as a satellite) to visit and refuel, or another spacecraft (such as the spacecraft 100) may travel between the spacecraft 100 other spacecraft (such as a satellite) to carry fuel between the spacecraft.

Figure 3:
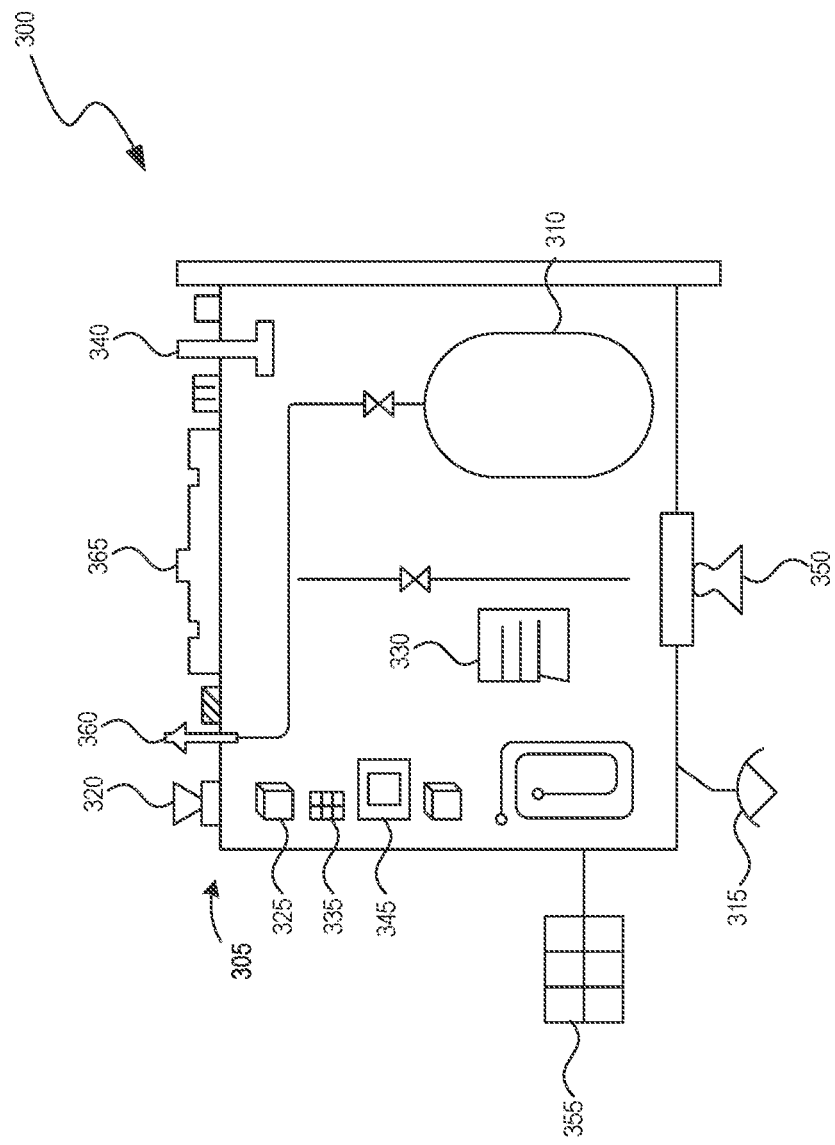
FIG. 3 illustrates a partially schematic view of a spacecraft configured to transport, deliver, store, and/or process materials in accordance with embodiments of the present technology.

FIG. 3 illustrates a partially schematic view of a spacecraft 300 configured to transport, deliver, store, and/or process materials in accordance with another embodiment of the present technology. The spacecraft 300 can also be referred to as a tanker or a fuel depot. The spacecraft 300 can be generally similar to the spacecraft 100 described above with regard to FIG. 1, but it can have a smaller form, such as a size and shape similar to a CubeSat. In some embodiments, it can be sized and shaped to fit within an EELV Secondary Payload Adapter or other payload adapter for launch. In some embodiments described above (with reference to FIG. 1) the spacecraft can be launched full of fuel to rendezvous with other spacecraft to fuel or refuel the other spacecraft. In other embodiments, it can be stored full of fuel in an orbit until a controller moves it to rendezvous with another spacecraft for fueling or refueling the other spacecraft. In some embodiments, the spacecraft 300 can be docked with other similar spacecraft 300, or with different spacecraft, to form a larger depot or tanker farm.

The spacecraft 300 can include a chassis 305, which can contain various components of the spacecraft 300, such as a container 310 with an enclosed interior volume. In some embodiments, the container 310 can be integral with the chassis 305, or the container 310 can be a separate element contained within the chassis 305. The container 310 can be rigid, semi-rigid, or it can be a flexible container similar to the flexible containers or tanks described below. For example, in some embodiments, the container 310 can be deployed from the chassis 305 and extend beyond the chassis 305, with one or more portions of the container 310 being positioned outside of the chassis 305 (similar to the embodiments generally illustrated in FIG. 5, which are described below). In some embodiments, the container 310 can be a blow-down tank, with a separation layer or membrane filled with material to push fuel out of the container 310 (described in additional detail below). In some embodiments, the enclosed interior volume of the container 310 can be divided with a bulkhead to form multiple interior volumes.

The spacecraft 300 can include other systems and subsystems, such as those described above with regard to FIGS. 1 and 2. For example, the spacecraft 300 can include communications systems 315 for communicating audio, video, and/or data with other spacecraft and/or a ground control station. Video and/or other images can be captured using one or more camera systems 320. The spacecraft 300 can include guidance, navigational, and control systems such as a gyroscope 325, an avionics and control computer 330, one or more sun sensors 335 for determining pointing, one or more rangefinders 340 (which can use laser, radar, and/or imagery analysis for detecting range) for determining range between the spacecraft 300 and other spacecraft or objects, one or more position determination systems 345 (such as GPS, GLONASS, Galileo, or BeiDou, or inputs from various sensors such as sun sensors, magnetic sensors, star trackers, or other suitable position determination systems) for navigation. The spacecraft 300 can further include one or more propulsion systems 350 suitable for facilitating orbit transfers, stationkeeping, pointing, and/or other orbital navigation operations. Propulsion systems 350 can be positioned in any suitable position on the spacecraft 300. Propulsion systems 350 can include rocket engines, electric thrusters, and/or other suitable space propulsion systems. One or more solar arrays 355 can provide electrical power for the spacecraft 300.

To facilitate transfer of materials with other spacecraft, the spacecraft 300 can include a coupling structure 360 connected to the container 310. To facilitate mechanical docking with other spacecraft, the spacecraft 300 can include a docking element 365, which can provide axial and/or rotational mechanical alignment and provide stiffness and strength to the connection when the spacecraft 300 is docked with another spacecraft. In some embodiments, the docking element 365 and the coupling structure 360 can be combined into a single coupling structure that includes mechanical docking features, fluid transfer connectors, electrical connectors, signal (e.g., data) connectors, heat transfer connectors, and/or other connectors, as described in additional detail below with regard to FIGS. 13-15F. A combined coupling structure can include dampers to absorb vibration or shock during a docking process, and/or elements to allow dissimilar electrostatic potentials to dissipate (e.g., with minimal arcing).

In some embodiments, several spacecraft 300 can be joined together (such as by connecting coupling structures 360 and/or docking elements 365 with each other) to form a larger aggregate spacecraft having multiple containers 310. Such a grouping of spacecraft 300 can be similar to the spacecraft 200 illustrated in FIG. 2. In some embodiments, individual spacecraft 300 in the aggregate spacecraft can include various subsystems, such as water processing systems, hydrocarbon processing systems, and/or other systems for processing materials for storage and/or distribution. For example, different spacecraft with different purposes and internal subsystems can be grouped together in the aggregate spacecraft. An aggregate spacecraft can include propulsion systems, solar arrays, avionics, controllers, and docking and coupling devices.

Figure 4:
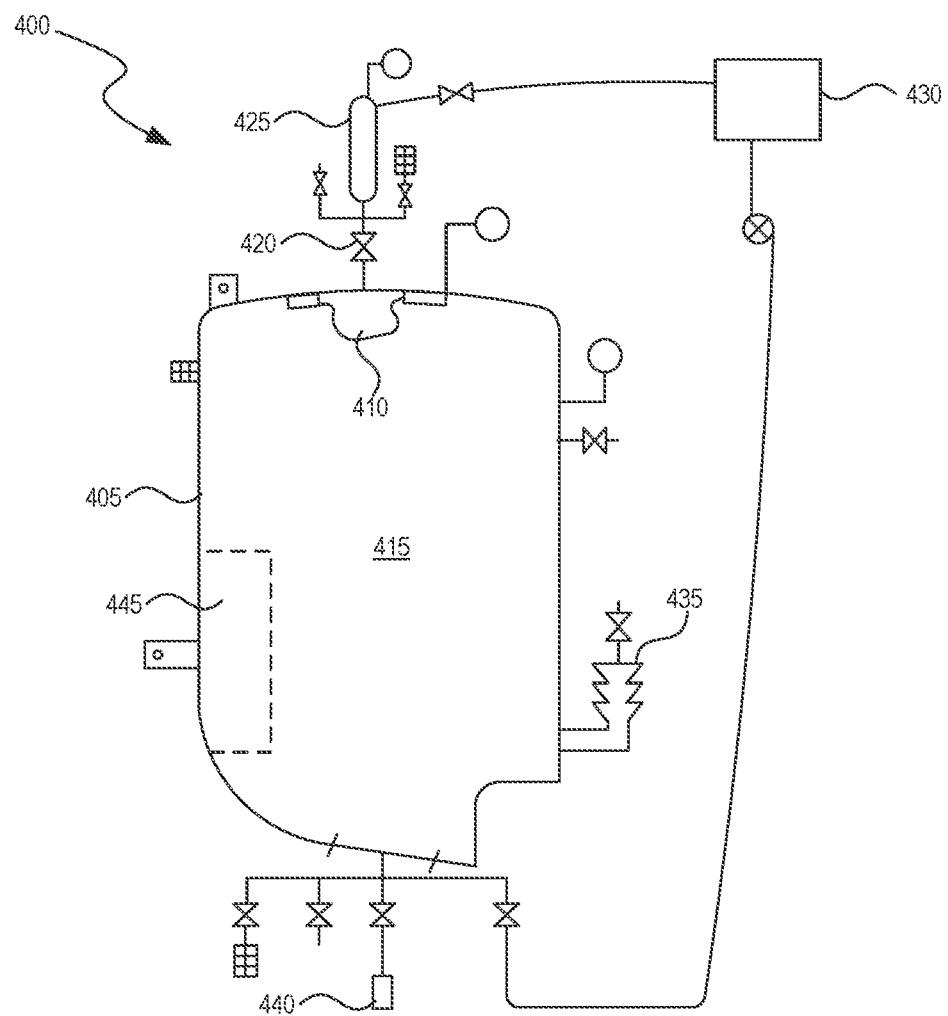
FIG. 4 illustrates a partially schematic view of a storage container system in accordance with embodiments of the present technology.

FIG. 4 illustrates a schematic view of a storage container system 400 in accordance with an embodiment of the present technology. The storage container system 400 can include a storage container 405 (which can be referred to as a tank). The storage container 405 can be rigid, semi-rigid, or flexible. A separation bladder 410 can be a blowdown bladder functioning as an expulsion device for expelling materials from the storage container 405, and/or it can function as a bulkhead to divide the enclosed interior volume 415 of the storage container 405 into multiple compartments. In other embodiments, an expulsion device can include a pump to expel materials from the storage container 405. A pressurization valve 420 can regulate pressure to the separation bladder 410 from a pressurant tank 425, which can be filled or pressurized by a gas generator 430. In some embodiments, the gas generator 430 can include a solid propellant, and/or it can include other gas-generating components. In some embodiments, the gas generator 430 can convert fluid in the storage container 405 to gas to pressurize the separation bladder 410 (by evaporation or chemical conversion, for example). In some embodiments, the gas generator 430 is a reformer, which can convert gases from the bladder 410 to liquids for return into interior volume 415 outside of the bladder 410. In some embodiments, the storage container 405 can include an accumulator 435 to accommodate expansion of any materials within the storage container 405 or to accommodate temporary or permanent surges in pressure or capacity. A coupling system 440, which can be similar to other connectors or coupling systems described herein, can facilitate connection of the storage container 405 to other spacecraft for transfer of materials to and from the storage container 405. In addition to fluids, the coupling system 440 can optionally transfer mechanical forces, electrical power, heat, data, and/or other substances. For example, the connector 440 can be a multi-purpose coupling structure described in additional detail below. A baffle element 445 can be positioned within the enclosed interior volume 415 to reduce sloshing. The storage container system 400 can be implemented in any of the spacecraft or satellites described herein, or in other spacecraft.

Figure 5:
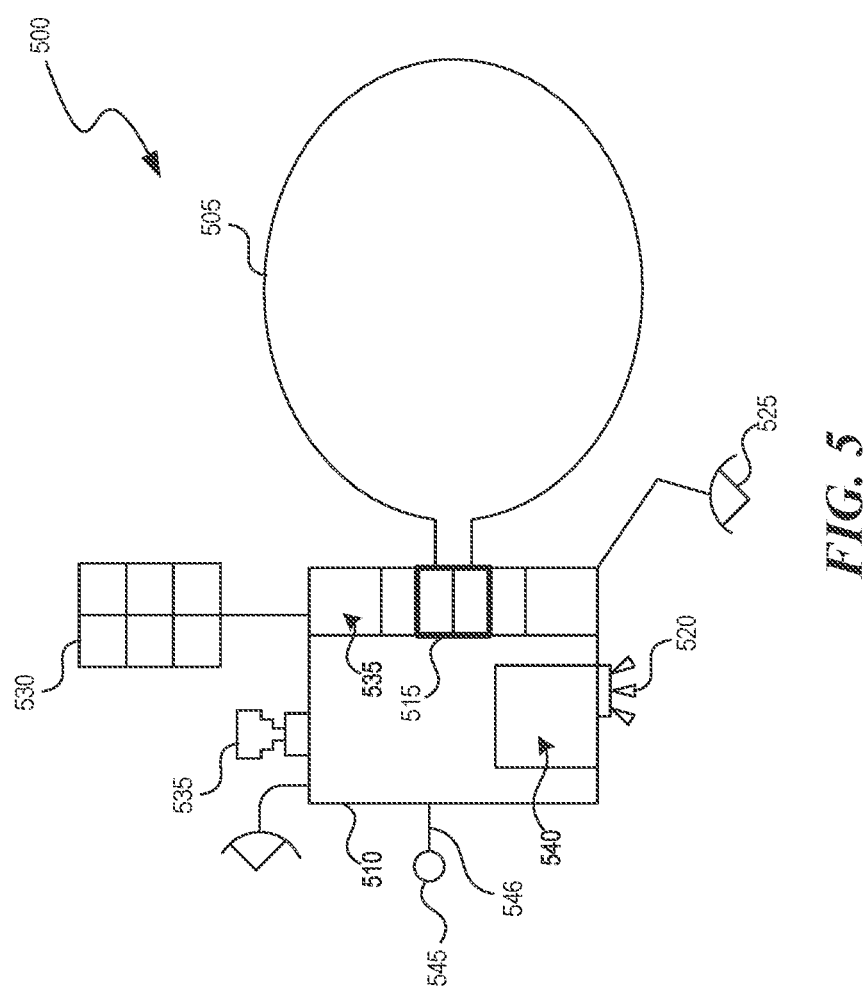
FIG. 5 illustrates a partially schematic view of a spacecraft in accordance with embodiments of the present technology.

FIG. 5 illustrates a partially schematic view of a spacecraft 500 configured in accordance with embodiments of the present technology. The spacecraft 500 can be a satellite (such as a communications satellite, reconnaissance satellite, or other satellite), or it can be another type of spacecraft described herein. The spacecraft 500 includes a flexible container 505 (which can be referred to as a flexible tank) for receiving, storing, and/or delivering materials, such as fuel or water. The flexible container 505 can be stowable, deployable, flexible, and expandable (for example, it can have elastic characteristics or it can be inelastic). For example, it can be stowed until needed for storage of fuel and/or other material during a space mission. The spacecraft 500 can be launched into orbit without any fuel, and another spacecraft can provide fuel and/or other material to the spacecraft 500, whereby the flexible container 505 deploys from a main body 510 (which can be referred to as a satellite bus) of the spacecraft 500 to receive and store the fuel. The flexible container 505 can be stowed, deployed, emptied, and refilled multiple times. The spacecraft 500 can include a pressurization system operatively connected to the flexible container 505 to expand or contract the flexible container 505.

In some embodiments, the flexible container 505 can be formed in whole or in part as a membrane having a fluid barrier layer. In some embodiments, the flexible container 505 can have multiple additional layers, including layers for micro-meteoroid protection (which can be self-healing, for example by including a gel or other substance to flow into and cure in punctures or other damage). In some embodiments, the flexible container 505 can include materials that harden or stiffen (such as by curing) after deployment. In some embodiments, reinforcing fibers, cables, and/or strings can be distributed in and/or around the membrane material for reinforcement.

In some embodiments, the flexible container 505 can be stowed in and/or deployed from a packing receptacle 515 carried by the spacecraft 500. The packing receptacle 515 can provide a mechanical attachment to maintain connection between the flexible container 505 and the remainder of the spacecraft 500. The packing receptacle can also include conduit or piping to transfer fluids and/or signals in and out of the container 505.

In some embodiments, the main body 510 of the spacecraft 500 can have a size, shape, or other form similar to a CubeSat specification, or it can have other sizes or forms. The flexible container 505 can be sized to hold a variety of quantities of volume. Containers according to embodiments of the present technology can hold between 100 grams and 100,000 tons of material, or other amounts of material.

The spacecraft 500 can include systems and subsystems for carrying out a space mission. For example, the spacecraft 500 can include one or more propulsion systems 520 (which can be similar to other propulsion systems described herein) suitable for facilitating orbit transfers, stationkeeping, pointing, and/or other navigation operations. Propulsion systems 520 can be positioned in any suitable position on the spacecraft 500. Propulsion systems 520 can include rocket engines, electric thrusters, and/or other suitable space propulsion systems. The spacecraft 500 can include one or more communication systems 525 (for audio, video, data transmission, and/or other transmissions). A power system 530, which can include a solar array, can be included in the spacecraft 500 to provide electrical power to the spacecraft 500. The main body 510 can also include navigation systems 535, such as attitude determination and control systems, guidance, navigation, and control systems, avionics controllers, and/or other suitable navigation systems. A payload 540 can be carried outside and/or within the main body 510.

In some embodiments, the spacecraft 500 can include one or more coupling structures 545, which can include one or more connectors for transferring fluid, electricity, data, and/or for performing other functions. In some embodiments, one or more coupling structures 545 can be carried by a boom 546. In some embodiments, the coupling structures 545 can be on a surface of the main body 510 or otherwise suitably supported. In some embodiments, the coupling structures 545 can be multi-purpose coupling structures described in additional detail later.

Figure 6:
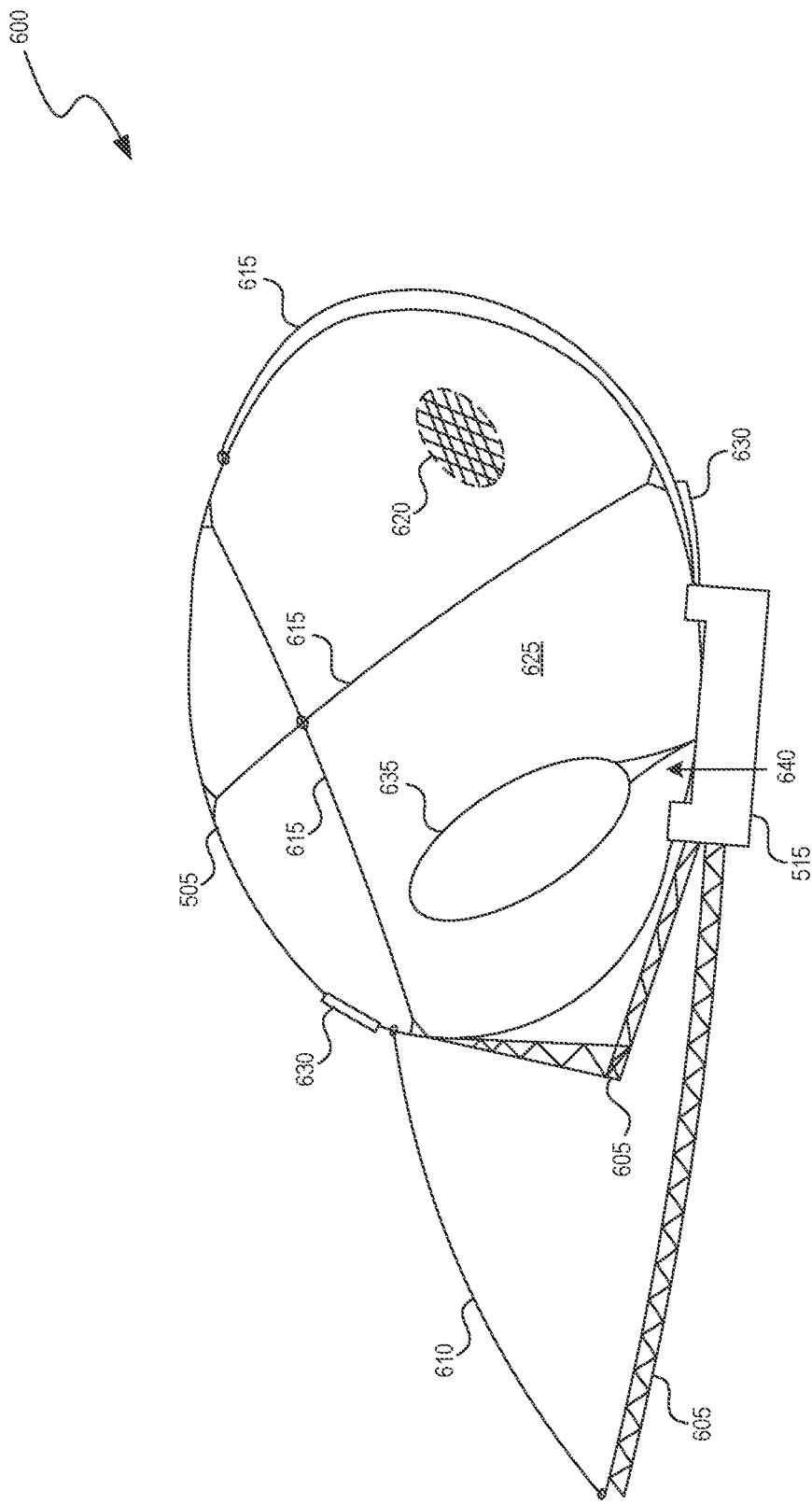
FIG. 6 illustrates a partially schematic view of a flexible container assembly in accordance with embodiments of the present technology.

FIG. 6 illustrates a partially schematic view of a flexible container assembly 600 in a deployed configuration in accordance with an embodiment of the present technology. The flexible container 505 can deploy from the receptacle 515 and it can be supported by one or more supporting structures, and/or it can include stiffening structures. The receptacle 515 serves as a chassis or other interface to a satellite carrying the flexible container assembly 600. One or more booms 605 (which can be formed by a truss or another elongated structure) can extend away from the receptacle 515 or the spacecraft (500, see FIG. 5), and one or more guy-wires 610 can connect an end of the boom 605 to the flexible container 505. The one or more booms 605 and guy-wires 610 can provide stability for the flexible container 505. In some embodiment, one or more booms may be positioned inside, and extend within, the flexible container 505 and support the flexible container 505 from within. In some embodiments, one or more booms 605 can be connected to the flexible container 505 without a guy-wire. In some embodiments, booms 605 can include and/or be part of doors or other restraint mechanisms for holding the flexible container 505 when the container 505 is in the stowed configuration (see for example, FIG. 10A, which is described below and illustrates doors or cover elements 1010, which may include booms 605).

In some embodiments, internal or external stringers 615 can traverse internal and/or external surfaces of the flexible container 505 and/or can be positioned between layers of the flexible container 505 to provide support against internal pressure and/or to provide stiffness. The stringers 615 can be rigid, semi-rigid, or flexible. For example, stringers 615 can include cords, wires, ropes, tapes, tubes, trusses, sheets, and/or beams. The stringers 615 can provide vibration damping. Stringers 615 can be attached to the flexible container 505 with adhesive, fasteners, and/or other suitable attachment devices. In some embodiments, stringers 615 can be connected to each other, for example to form a net that may or may not be attached to the flexible container 505 (such a net can, in some embodiments, surround at least a portion of the flexible container 505). In some embodiments, one or more stringers can be connected to the flexible container 505 along an entire length of the stringer, along part of the length of the stringer, at selected points along the stringer, or only at endpoints of the stringer.

In some embodiments, a matrix material 620, which can include foam or another porous material, can be positioned in the enclosed interior volume 625 of the flexible container 505. The matrix material 620 can fill part or all of the interior volume 625. The matrix material 620 can provide internal support for the flexible container 505 while allowing materials to pass through its pores. In some embodiments, the matrix material 620 can be deployed from the receptacle 515. In some embodiments, the matrix material 620 can harden or stiffen after deployment.

In some embodiments, one or more external stiffening elements 630 can deploy from the receptacle 515 to provide a stiffening area and/or protective barrier to prevent or resist contact between sides of the flexible container 505 and other elements of the spacecraft (to help prevent damage to the flexible container 505). For example, the stiffening elements 630 can help resist twisting, shifting, and/or sagging of the flexible container 505 during movements of spacecraft that carry the flexible container 505. In some embodiments, external stiffening elements can be formed as doors or flaps that cover the flexible container 505 before deployment, but open to provide structure after deployment. The stiffening elements 630 can deploy in other suitable ways from the receptacle 515 or other parts of the spacecraft, and they can fully or partially surround the interface between the flexible container 505 and the receptacle 515. The stiffening elements 630 can be positioned on other portions of the flexible container 505, such as portions of the flexible container 505 that are not adjacent to the receptacle 515.

In some embodiments, an internal baffle 635, which can optionally be supported and/or restrained with a support 640 connected to the receptacle 515 and/or by one or more stringers 615, can be positioned in the enclosed interior volume 625 to prevent or reduce sloshing of materials in the interior volume 625.

Figure 7:
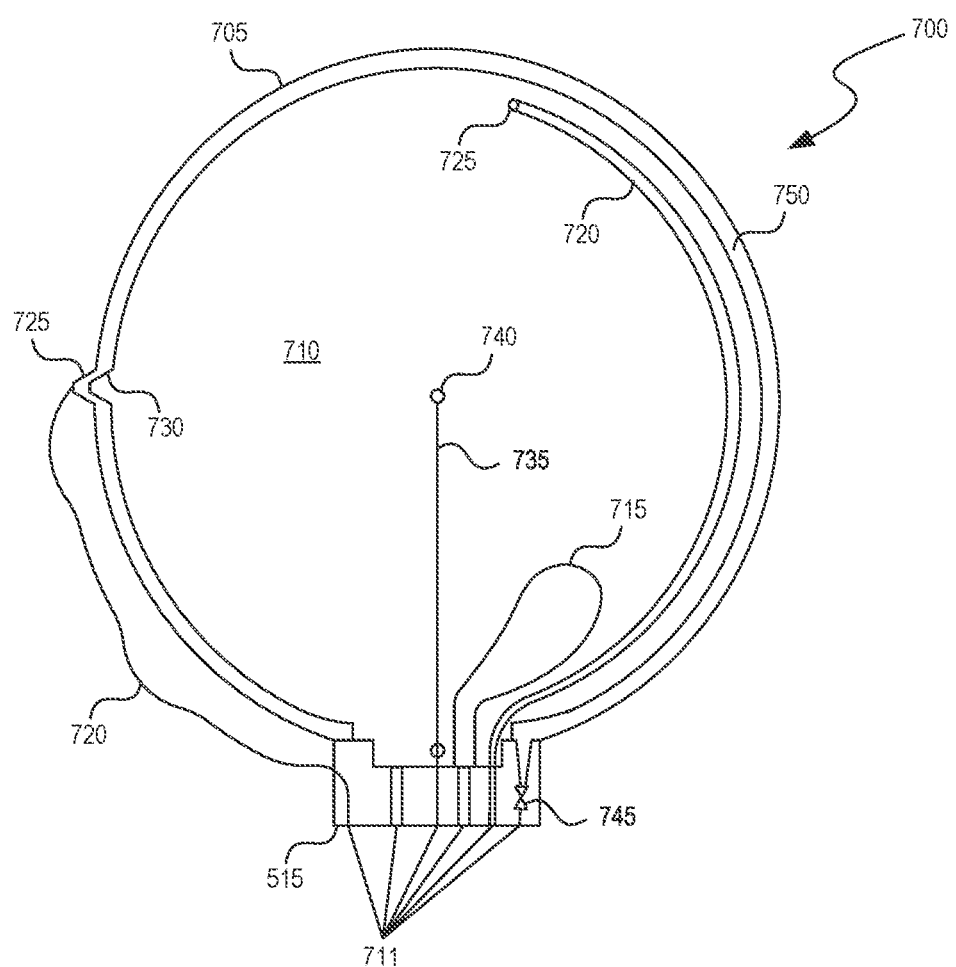
FIG. 7 illustrates a partially schematic view of a flexible container assembly in accordance with embodiments of the present technology.

FIG. 7 illustrates a partially schematic view of a flexible container assembly 700 in accordance with another embodiment of the present technology. The flexible container assembly 700 can be generally similar to the flexible container assembly 600 illustrated and described above with regard to FIG. 6, and it can be implemented in a spacecraft, such as a satellite. A flexible container 705 includes an outer flexible bladder 750 with an enclosed interior volume 710 within which an inner flexible bladder 715 can be positioned. The inner flexible bladder 715 can be an expulsion device, and it can function as a secondary blow-down bladder that can be expanded (such as by filling with gas and/or fluid) to pressurize the interior volume 710 and expel material from the interior volume 710. In some embodiments, the inner flexible bladder 715 can include insulating materials to facilitate storage of two different materials at two different temperatures within the flexible container 705. Accordingly, in some embodiments, flexible containers can accommodate two or more fluids that can be separated by the inner flexible bladder 715. For example, spacecraft according to embodiments of the present technology can carry a fuel and an oxidizer within the flexible container 705. In some embodiments, the flexible container assembly 700 can carry a liquid phase and a vapor phase of the same material (for example, liquid water and water vapor), by accommodating one phase in the inner flexible bladder 715 and one phase outside of the inner flexible bladder 715. In some embodiments, a pressure differential between the interior volume 710 and the interior of the inner flexible bladder 715 can be created by pressurizing the inner flexible bladder 715 (which can be constructed with an elastomer material) against the pressure in the interior volume 710.

In some embodiments, the receptacle 515 can operate as a chassis or interface to the satellite carrying the flexible container assembly 700, and the receptacle 515 can include one or more fluid access points 711 to transfer fluids between the satellite and the assembly 700. In some embodiments, tubes 720 and/or other plumbing for accessing and/or distributing materials in the flexible container assembly 700 can be positioned outside of and/or within the flexible container 705, with access ports 725 to access the enclosed interior volume 710. In some embodiments, tubes 720 within the interior of the flexible container 705 can be porous or otherwise include a plurality of openings for collecting and/or distributing materials along the length of the tubes 720. In some embodiments, an equatorial bulge 730 can encircle all or part of a midsection (such as an equatorial section if the container 700 is generally cylindrical or spherical). The equatorial bulge 730 can permit dense materials to gather in the bulge for access by one of the tubes 720. For example, a spacecraft can spin to create centripetal forces that bring more dense or heavier materials to collect in the equatorial bulge, which can be accessed by a tube 720. Fluids having relatively low density, or other fluids or materials, can be accessed with a central tube 735 positioned within the interior volume 710. The central tube 735 can be porous in some embodiments, and/or it can have an end point 740 with a diffuser, filter, or other fluid management device. In some embodiments, fluid can be collected at any position on the central tube 735. One or more valves 745 can be implemented on any of the tubes 720, fluid access points 711, or other fluid passageways.

In some embodiments, a bladder (750 or 715) or other wall of a flexible container 705 can include multiple layers. For example, the outer flexible bladder 750 can be formed with two or more separate flexible bladders, one inside the other. In some embodiments, a space or gap between two or more separate flexible bladders forming the outer flexible bladder can be used for blow-down or pressurization of the interior volume 710, as storage, or for providing self-healing functionality, as described above (for example, a gel can be positioned in the gap to fill damage to the outer flexible bladder 750). In some embodiments, there may not be a space or gap between the two or more separate flexible bladders that form an outer flexible bladder; instead, the two or more separate flexible bladders can merely be laying adjacent to one another.

Figure 8:
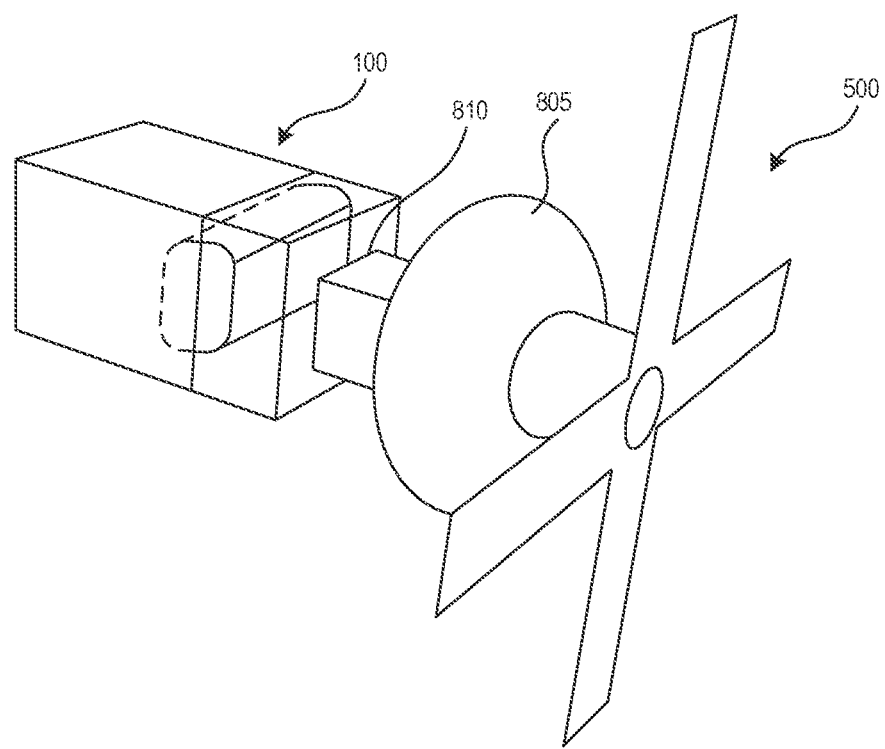
FIG. 8 illustrates two spacecraft docked together, in which one of the spacecraft has deployed a flexible container, in accordance with embodiments of the present technology.

FIG. 8 illustrates two spacecraft docked together, in which one of the spacecraft has deployed a flexible container 805, in accordance with another embodiment of the present technology. For example, a first spacecraft can be a tanker 100 (described above with regard to FIG. 1), and it can be docked to a satellite 500 (described above with regard to FIG. 5) using a coupling system 810. FIG. 8 illustrates a representative refueling operation in which the tanker 100 supplies fuel to the satellite 500 before the tanker 100 and the satellite 500 undock or uncouple from one another. The flexible container 805 expands or extends away from the satellite.

Figure 9:
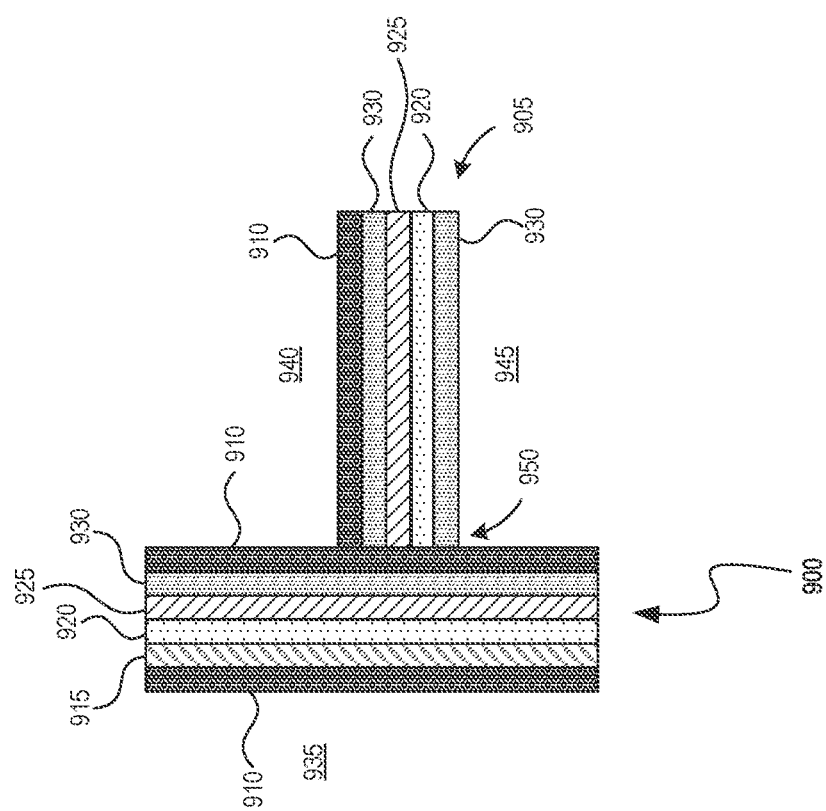
FIG. 9 illustrates a schematic view of a wall and a bulkhead forming a portion of a flexible container in accordance with embodiments of the present technology.

FIG. 9 illustrates a schematic view of layers of a wall or membrane 900 forming at least a portion of a flexible container in accordance with an embodiment of the present technology. FIG. 9 also illustrates layers of a bulkhead 905, which can divide enclosed interior volumes in containers according to embodiments of the present technology. In some embodiments, the membrane 900 can include one or more abrasion barriers 910 positioned as an outermost layer or among outermost layers to protect against scuffing or external friction. In some embodiments, abrasion barriers 910 can be positioned on interior layers or as an innermost layer to protect against abrasion from materials stored within the flexible container. Interior layers of any suitable type can facilitate directing trapped air or fluid to one or more vents when the flexible container is empty, collapsed, and/or stowed. A micrometeoroid barrier 915 can be formed with materials suitable to prevent or reduce punctures or other damage from space debris or micrometeoroids (e.g., a multilayer "Whipple shield"), and can be positioned within or adjacent to the abrasion barrier 910. A thermal barrier 920 comprising insulative material can be positioned in the membrane 900 to reduce or prevent heat transfer through the membrane 900. A mechanical barrier 925 in the membrane 900 can provide structural support and/or protection from larger debris or meteoroids. A fluid barrier 930 can be positioned in the membrane 900 to limit or prevent fluid transfer out of the membrane 900.

The bulkhead 905 can have a similar arrangement of layers forming the membrane 900, or it can have a different arrangement with other types or quantities of layers. In some embodiments, not all layers may be used, and in a particular embodiment, there may only be a fluid barrier in the membrane 900 or the bulkhead 905. In some embodiments, some layers and/or an entirety of a portion of the membrane 900 or the bulkhead 905 can have elastic properties, or the layers can be inelastic. The bulkhead 905 can be joined to the membrane 900 at a joint 950, where some or all of the constituent layers of the membrane 900 and bulkhead 905 can be joined to each other. In some embodiments, a single layer can incorporate features or functions of multiple layers.

For context, in some embodiments, the vacuum of space 935 can be positioned outside of the membrane 900, a first fluid or material 940 (such as propellant or fuel) can be positioned inside of the membrane 900 on a first side of the bulkhead 905, and/or a second fluid or material 945 (such as propellant or fuel) can be positioned inside of the membrane 900 on a second side of the bulkhead 905 opposite the first side.

FIGS. 10A-10E illustrate views of stowed flexible containers 1000 (which can include one or more bladders, such as inner and outer bladders) according to several embodiments of the present technology. The flexible containers 1000 can be similar to other flexible containers and membranes described herein. In some embodiments, flexible containers 1000 can be folded, rolled, and/or otherwise stowed during launch of a vehicle incorporating the flexible containers. The flexible containers can be deployed from the stowed configuration, for example, by pressurizing them or filling them with materials. In some embodiments, the receptacle 515 can contain the stowed flexible container 1000 until the flexible container 1000 is deployed. Optionally, one or more doors or cover elements 1010 can cover the container 1000 and/or generally close a top portion of the receptacle 515 until the cover elements open 1010 to allow the flexible container 1000 to deploy. In some embodiments, instead of or in addition to doors, other cover elements 1010 can restrain the container 1000, such as straps, latches, and/or other releasable cover elements. In some embodiments, the receptacle 515 can be primarily smooth or lacking in sharp edges to resist or prevent damage to the container 1000 during deployment or use. A diffuser, valve, and/or other plumbing 1005 can connect the rolled or stowed container 1000 to the receptacle 515 and/or other parts of the spacecraft.

Figure 10A:
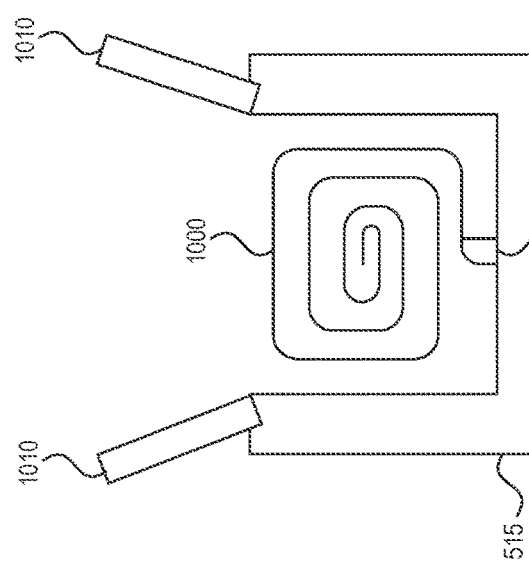
FIGS. 10A-10E illustrate example stowed configurations of flexible containers in accordance with embodiments of the present technology.
Figure 10B:
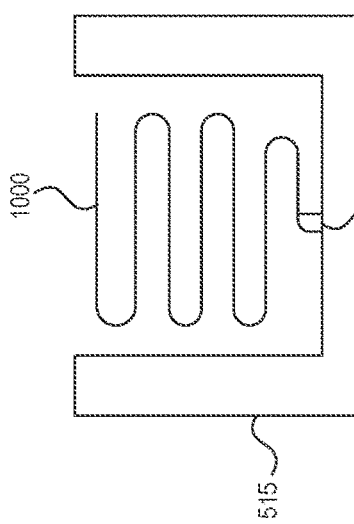
Figure 10C:
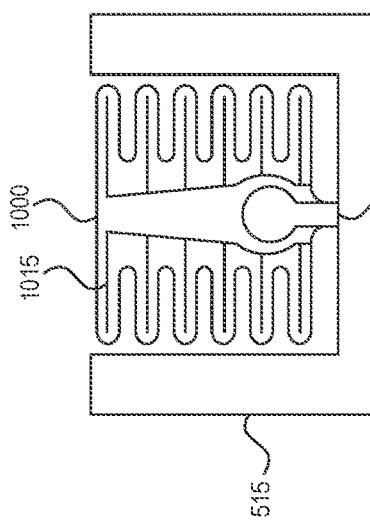
Figure 10D:
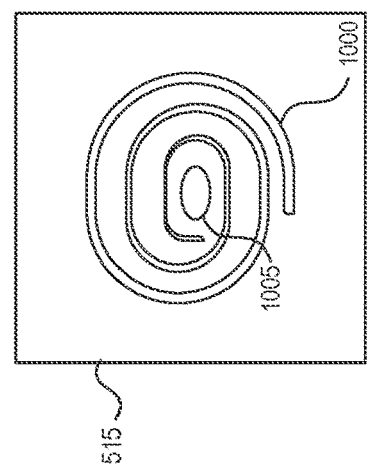
Figure 10E:
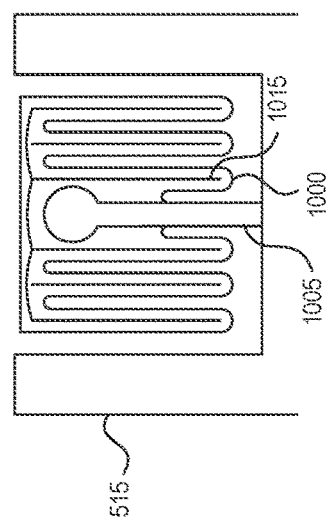

In particular, FIG. 10A illustrates a side view of a flexible container 1000 rolled in a horizontal roll (relative to the receptacle 515). FIG. 10B illustrates a side view of a flexible container 1000 folded upon itself in a single-fold arrangement. FIG. 10C illustrates a side view of a flexible container 1000 folded upon itself in a double-fold arrangement. FIG. 10D illustrates a side view of a flexible container 1000 rolled in a vertical roll (perpendicular to the horizontal roll illustrated in FIG. 10A). FIG. 10E illustrates a side view of a flexible container 1000 folded in a horizontal concertina (like an accordion or bellows) configuration. In some embodiments, the flexible container can be folded in a vertical concertina configuration (for example, perpendicular to the horizontal configuration shown in FIG. 10E). In some embodiments, containers 1000 with outer flexible bladders and inner flexible bladders can be folded or rolled in any of the foregoing manners. Additional internal and/or external membranes can be included to resist friction and/or sticking of the various folds or rolls in the deployment process, and/or to facilitate egress of trapped matter (e.g., air or fluid) from the containers 1000 when the flexible containers 1000 are being stowed, packed, and/or emptied. For example, as illustrated in FIGS. 10C and 10E, a porous membrane 1015 (e.g., felt, cloth, or another suitable porous material) can be positioned inside the flexible container 1000.

Figure 11:
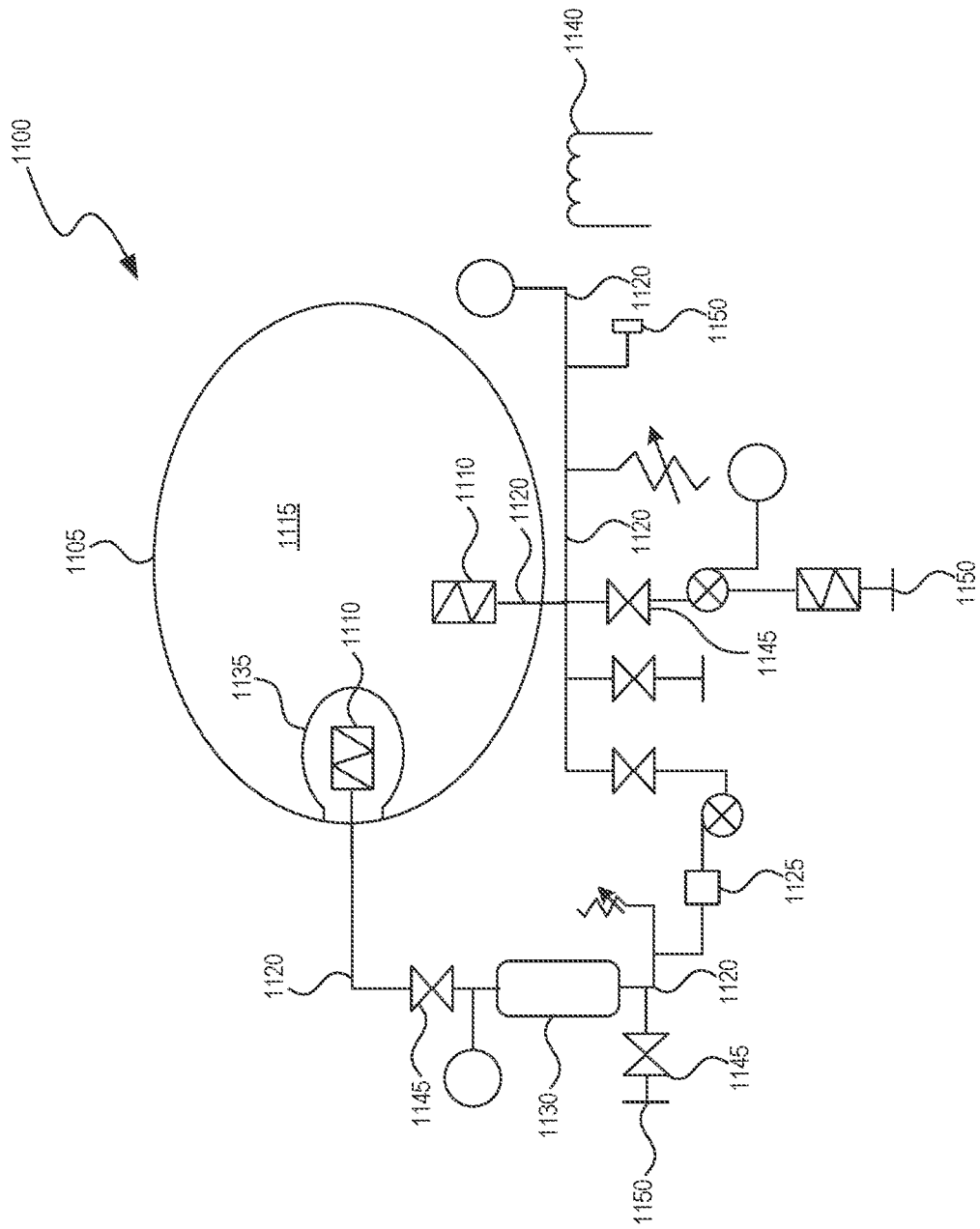
FIG. 11 illustrates a fluid management system for managing fluids in flexible containers in accordance with embodiments of the present technology.

FIG. 11 illustrates a fluid management system 1100 for managing fluids in flexible containers 1105 in accordance with embodiments of the present technology. A diffuser 1110 or other vent, valve, or flow distribution structure can be positioned in the enclosed interior volume 1115 of the flexible container 1105. The diffuser 1110 can distribute fluid or other material flow into the flexible container 1105 to reduce localized stress on the container. For example, a piccolo tube can be used as the diffuser. A piccolo tube can include a tube with a plurality of flow distribution holes distributed along its length and/or diameter, and can be positioned on an end of the fluid management piping 1120 within the interior volume 1115.

In some embodiments, a gas generator and/or reformer 1125 (which can be similar to the gas generator and/or reformer 430 illustrated and described above with regard to FIG. 4) can be operatively connected to a pressurant tank 1130 (such as by piping 1120, or by a direct connection with the volume within the inner flexible membrane 1135). The gas generator and/or reformer 1125 can provide gas to pressurize the pressurant tank 1130, which can in turn provide pressure for an inner flexible membrane 1135. The inner flexible membrane 1135 can be pressurized and/or expanded to provide a blow-down function for the flexible container 1105 (the inner flexible membrane 1135 can form part of an expulsion device to expel material from the flexible container 1105) and/or it can be used to store a material of a different composition, temperature, and/or other properties inside the container 1105 but separate from the remainder of the enclosed interior volume 1115. In some embodiments, the interior volume 1115 of the flexible container 1105 may be pressurized to expel material from the inner flexible membrane 1135. In some embodiments, the flexible container 1105 can be filled or pressurized with the gas generator and/or reformer 1125, for example, via piping 1120 or a direct connection with the interior volume 1115.

In some embodiments, a heater and/or chiller system 1140 can be incorporated into the fluid management system to heat or cool materials in the system. For example, the heater and/or chiller system 1140 can be thermally coupled to piping 1120 to maintain desired operating temperatures in the piping 1120. One or more valves 1145 can be distributed throughout the piping 1120 to enable or disable flow of materials in the piping 1120 to facilitate control of pressurization, storage, and/or distribution. One or more coupling systems 1150 with coupling structures according to embodiments of the present technology can be operatively connected to the piping 1120. In some embodiments, sensors distributed along the piping 1120, within the container 1105, and/or elsewhere in the fluid management system can include temperature sensors, pressure sensors, flow rate sensors, and/or fluid composition sensors. Other sensors can include stress sensors, radiation sensors, or other sensors suitable for monitoring the performance and status of the fluid management system 1100.

Figure 12A:
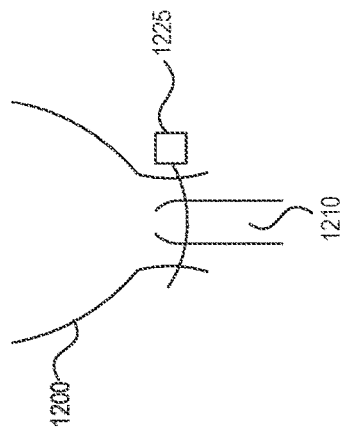
FIGS. 12A-12D illustrate partially schematic views of arrangements for connecting flexible containers to a spacecraft in accordance with embodiments of the present technology.
Figure 12B:
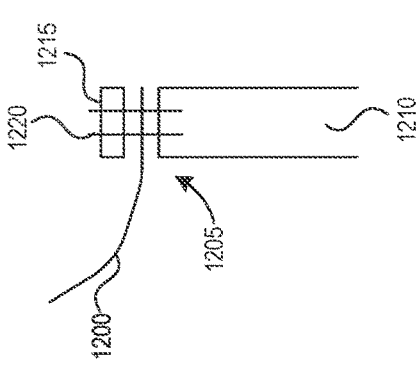

FIGS. 12A-12D illustrate partially schematic views of arrangements for connecting flexible containers 1200 to a spacecraft or to the receptacle 515 in accordance with embodiments of the present technology. Because the membranes of the flexible containers are flexible, a corresponding seal can be configured to account for the flexibility. Suitable seals can be formed in several ways. In some embodiments, an entirety of the flexible container wall can be sealed against the spacecraft and/or the receptacle 515, or in other embodiments, only the fluid barrier may be sealed against the spacecraft and/or the receptacle. For example, FIG. 12A illustrates a flange seal 1205 between the container 1200 and a portion of the spacecraft or receptacle, such as a plumbing or fluid transfer pipe 1210. The flange seal 1205 can include a flange element 1215 that is pressed against a pass-through opening of the container 1200 and sealed with the force of a bolt, screw, rivet, tie, clip, and/or other fastener 1220. The container 1200 or the fluid barrier is sealed between the flange seal 1205 and the pipe 1210 or other portion of the spacecraft or receptacle. FIG. 12B illustrates a hose clamp 1225 for sealing the container 1200 against the spacecraft.

Figure 12C:
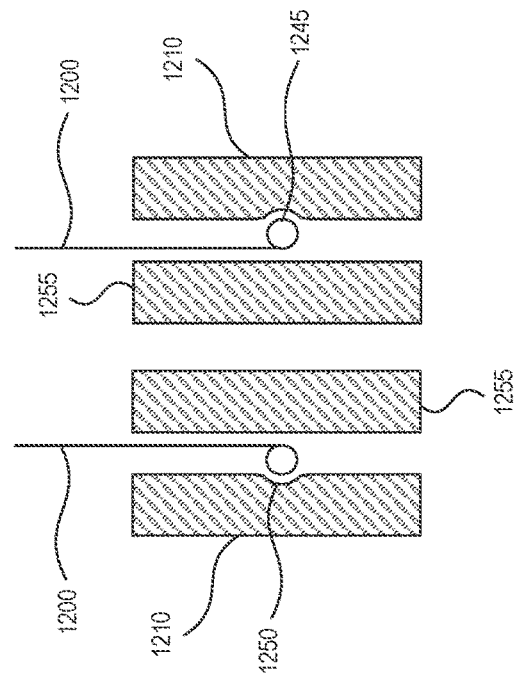
Figure 12D:
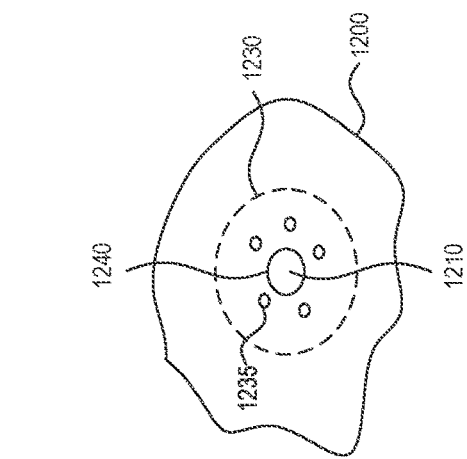

In other embodiments, flexible containers 1200 can be connected to spacecraft by adhesive, gaskets, and/or other attachments suitable for providing a sealed interface to transfer material from the container to other parts of the spacecraft. For example, FIG. 12C illustrates a top view of an arrangement for connecting a flexible container to the spacecraft. A gasket 1230 positioned between the container 1200 and the pipe 1210 or another part of the spacecraft can have bolt holes 1235, whereby bolts are positioned inside the container 1200, pass through the container 1200, through the gasket 1230, and fasten to the spacecraft. An orifice 1240 facilitates fluid transfer. FIG. 12D illustrates a side cross-sectional view of a seal created with an o-ring 1245 attached to or integral with the membrane of the container 1200 and positioned in a groove 1250 carried by the pipe 1210 or other portion of a spacecraft. An inner body member 1255 (which can be a ring or a collar) of the pipe 1210 can be positioned to press the o-ring 1245 into the groove 1250 to seal the connection.

C. Coupling Mechanisms and Interfaces

Spacecraft according to embodiments of the present technology can dock and/or couple with each other to facilitate transfer of materials between them. In one aspect of the technology, a first coupling structure of a first spacecraft can couple with a second coupling structure of a second spacecraft. The coupling structures can be androgynous, meaning each coupling structure can couple with any other similarly-configured coupling structure without regard to orientation as a male or female connector. The coupling structures can be multi-functional, such that multiple connections can be made when the coupling structures are brought together. For example, coupling structures can provide mechanical docking features, alignment features, fluid connecting features, electrical connecting features, data connecting features, and/or any other connecting feature suitable for transferring materials in space.

Figure 13:
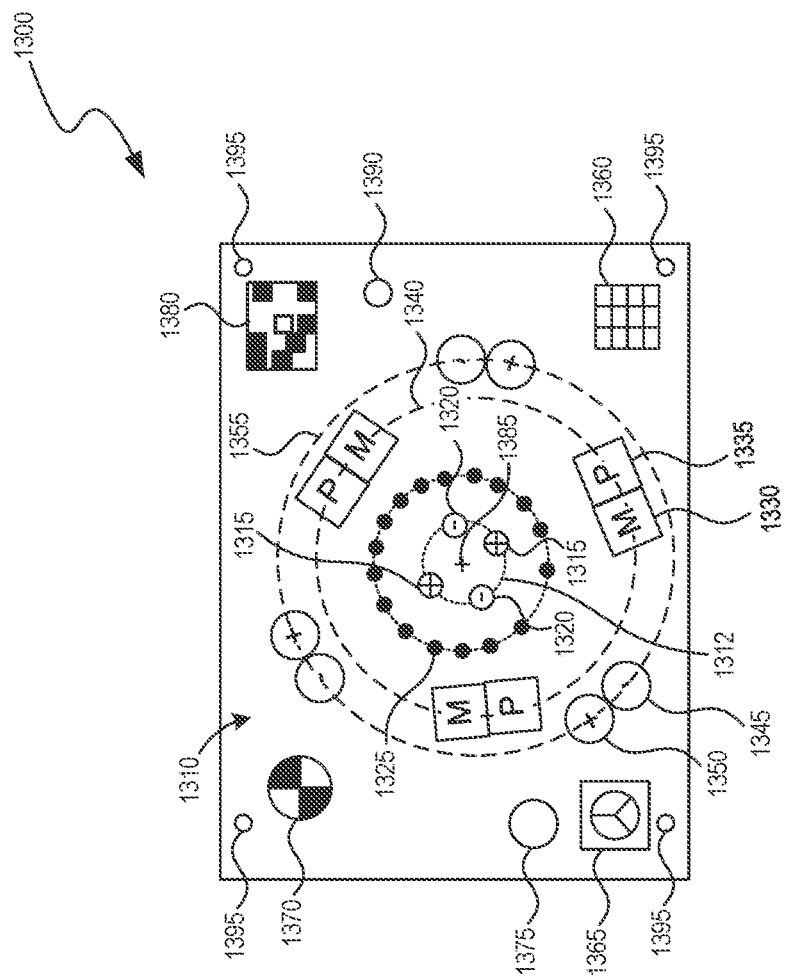
FIG. 13 illustrates a schematic view of an androgynous coupling structure in accordance with embodiments of the present technology.

FIG. 13 illustrates a schematic view of a coupling structure 1300 configured in accordance with an embodiment of the present technology. The coupling structure 1300 is able to mate with another coupling structure (for example, on another spacecraft) having the same arrangement of connectors. In some embodiments, all that may be needed to connect two coupling structures together is a clocking or rotation maneuver to align the couplings. In some embodiments, the coupling structure 1300 includes a mounting element 1310, which can be a mounting plate. In some embodiments, the mounting element 1310 can include a portion of a spacecraft, such that a mounting plate can be omitted and the features and/or connectors of the coupling structure can be mounted on the portion of the spacecraft, such as an outer wall or other surface. The mounting element 1310 carries the various connectors. In some embodiments, the connectors on the coupling structure 1300 can connect with other connectors on another coupling structure simultaneously or nearly simultaneously during a docking process.

In some embodiments, the coupling structure 1300 includes one or more fluid connectors for transferring fluid to or from another spacecraft via another coupling structure. For example, a plurality of fluid connectors can be arranged in a circular pattern 1312 to match a corresponding pattern on another coupling structure. In a particular example, as illustrated in FIG. 13, two female fluid connectors 1315 and two male fluid connectors 1320 can be positioned in a symmetric orientation capable of mating with the same arrangement on another coupling structure. There can be more or fewer fluid connectors 1315, 1320 and they can be arranged in one or more circular patterns, which may or may not be concentric with each other.

In some embodiments, the coupling structure 1300 includes one or more electrical connectors 1325, which can optionally be arranged in a circular pattern as shown in FIG. 13. The electrical connectors 1325 may themselves be androgynous, such that they can be generally similar to, or identical to, other electrical connectors on another coupling structure 1300 to facilitate androgynous coupling between the coupling structures 1300.

In some embodiments, the coupling structure 1300 includes one or more male mechanical docking connectors 1330 and female mechanical docking connectors 1335, which can be arranged in a circular pattern 1340 similar to the pattern 1312 of fluid connectors. The arrangement illustrated in FIG. 13 facilitates androgynous connection with another coupling structure 1300 having the same circular pattern 1340. The mechanical docking connectors 1330, 1335 mate with corresponding connectors 1330, 1335 to form a structural connection to couple two spacecraft together (via the coupling structures 1300), for example, during a fluid transfer process using the fluid connectors 1315, 1320. In some embodiments, mechanical docking connectors can include hooks, latches, pins, magnets (the "P" in FIG. 13 illustrates that the female connector 1335 can be a magnetically susceptible pad, while the "M" in FIG. 13 illustrates that the male connector 1330 can be a magnet that can be permanent or switchable), and/or other suitable male and female or androgynous mechanical connections. In some embodiments, mating mechanical docking connectors can include a projection and a recess to receive the projection, and/or a guiderail and a slot for receiving the guiderail.

In some embodiments, the coupling structure 1300 includes one or more alignment features to assist alignment of the coupling structures if they are slightly offset during a coupling sequence. For example, one or more male alignment features 1345 and female alignment features 1350 can be arranged in a circular pattern 1355 similar to the pattern 1312 of fluid connectors. The arrangement of alignment features facilitates androgynous connection with alignment features on another coupling structure having the same circular pattern 1355. In some embodiments, male alignment features 1345 can include a cone that can be shaped, sized, and positioned to engage a female alignment feature 1350, which can be a cup. In some embodiments, alignment features 1345, 1350 can include guiderails and pins, and/or a combination of features of different types suitable for facilitating mechanical alignment of coupling structures 1300 with each other.

Coupling structures 1300 can include additional features to facilitate androgynous docking. For example, indicators, such as lights 1360, reflectors 1365, and/or alignment indicators 1370, can be viewed, observed, and/or analyzed by operators, sensors, and/or cameras 1375 positioned on or adjacent to the coupling structure 1300. In some embodiments, barcodes (such as QR codes) 1380 can provide identifying information for the cameras 1375 or other sensors to read for identifying vehicles or other information, such as location information. In some embodiments, a camera can be positioned at a center axis or center point 1385 of the coupling structure 1300. In some embodiments, ranging system 1390, such as a laser rangefinder, lidar system, and/or radar system, can be included on the coupling structure 1300 to provide position information for docking maneuvers. The mounting element 1310 can include one or more bolt holes or other fastening features 1395 to mount the coupling structure 1300 to a spacecraft. In some embodiments, alignment and/or docking features can be incorporate into the fastening features 1395. The fastening features 1395 can include alignment features to assist a builder with aligning the coupling structure 1300 on a spacecraft.

An advantage of the coupling structure 1300 is that it can mate with identical or otherwise structurally similar (for example, having a matching arrangement of male and female connectors) coupling structures for an androgynous connection with another spacecraft. Such androgynous connections can enable several different vehicles to connect to each other for fluid transfer processes or other processes. According to various embodiments, any suitable number and type of connector can be positioned in circles or other patterns to provide an androgynous coupling structure 1300. In some embodiments, a male connector and a female connector can be adjacent to each other in a pair and other pairs of male and female connectors can be distributed about a circular or other symmetric pattern on the coupling structure 1300. Circular or other symmetric patterns can be concentric. In general, to facilitate androgynous coupling, matching couplings can have the same effective radius or distance from a center point 1385 of the coupling structure 1300.

Figure 14B:
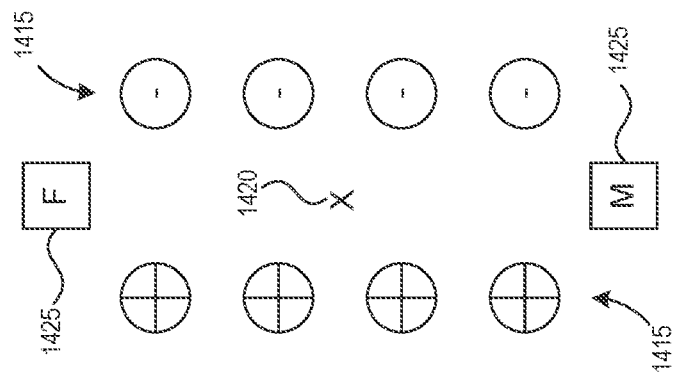
FIGS. 14A and 14B illustrate representative arrangements of connectors to facilitate androgynous connections between coupling structures, in accordance with embodiments of the present technology.
Figure 14A:
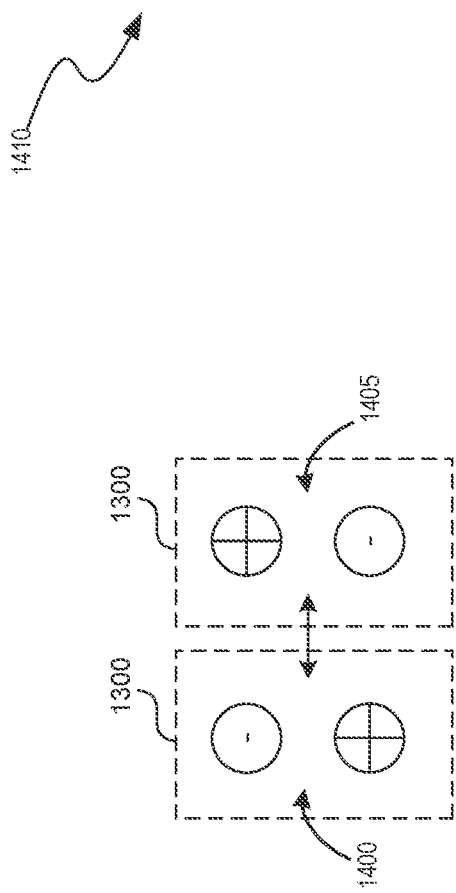

In some embodiments, for every type of connector (e.g., fluid, latching, alignment, electrical) there may be male and female and/or active and passive variants. In some embodiments, a first coupling structure 1300 can include a first set of connections, including active, passive, male, and/or female connections, while another coupling structure 1300 can include a subset of those connectors. In such embodiments, the coupling structures 1300 can be compatible and fully coupled, but with only a subset of connections enabled (for example, the connections can be limited to the connectors in the second coupling structure 1300). In some embodiments, a circular pattern of connectors can include more than one type of connector. For example, a single circular pattern of connectors can include one or more fluid connectors and one or more electrical connectors, or any suitable combination of connectors in one of the circular patterns, FIGS. 14A and 14B illustrate other representative arrangements of connectors that can facilitate androgynous connections between coupling structures 1300, in accordance with embodiments of the present technology. FIG. 14A illustrates, schematically, a male and female pair 1400, which can be on a first coupling structure 1300, arranged to mate with another male and female pair 1405, which can be on a second coupling structure 1300 and can be substantially identical to the pair 1405. The pairs can be rotated 180 degrees relative to each other to facilitate the mating connection. FIG. 14B illustrates, schematically, an arrangement 1410 that can be implemented on a face of a coupling structure 1300. For example, male and female connectors 1415 can be arranged in a rectangular or otherwise parallel configuration around a center point 1420, while other male and female connectors 1425 (marked M or F) can be positioned in opposing locations relative to the center point 1420. Accordingly, FIG. 14B illustrates another representative androgynous arrangement of connectors for a coupling structure. Embodiments of the present technology contemplate other arrangements of connectors suitable for forming a matching androgynous connection between coupling structures. In some embodiments, coupling structures 1300 may only need to be clocked (rotated) to align their androgynous features.

Figure 15A:
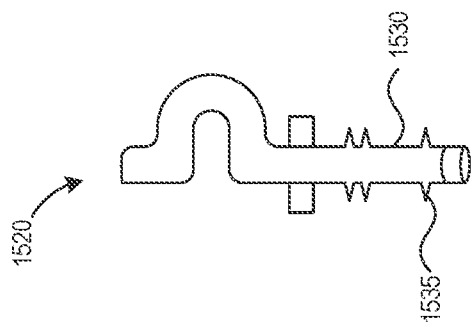
FIGS. 15A-15F illustrate partially schematic side view of connectors and portions of connectors that facilitate androgynous connections between coupling structures, in accordance with embodiments of the present technology.
Figure 15B:
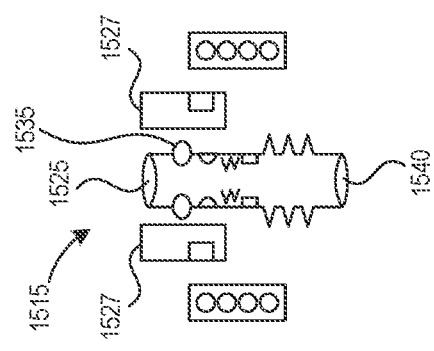
Figure 15C:
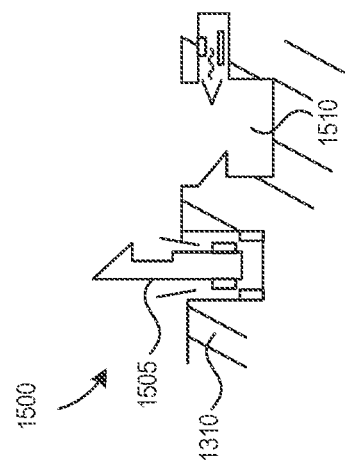
Figure 15D:
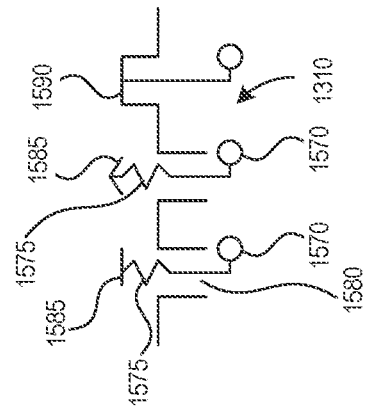
Figure 15E:
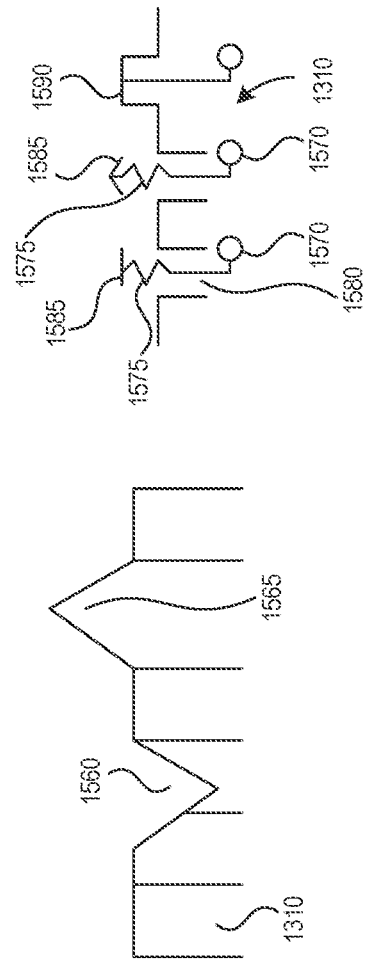

FIGS. 15A-15F illustrate partially schematic views of connectors and portions of connectors that facilitate androgynous connections between coupling structures, in accordance with embodiments of the present technology. The connectors can include mechanical, fluid, electrical, and other connectors that can be carried by the mounting element 1310 to form a coupling structure such as the coupling structure 1300 shown in FIG. 13. In some embodiments, a connector on a mounting element may include a male and female element positioned adjacent to each other (such as is illustrated in FIGS. 15A, 15D, and 15E), so that each mounting element 1310 includes a male element and a female element that mate with corresponding male and female elements on another mounting element 1310.

FIG. 15A illustrates a pin attachment system 1500, which can include a barbed pin 1505 positioned to mate with a corresponding barbed recess 1510. Barbs of the pin 1505 or the recess 1510 can be retractable to facilitate release of the connection. FIGS. 15B and 15C illustrate a female fluid connector 1515 and a male fluid connector 1520, respectively. The male and female fluid connectors facilitate connection and fluid transfer between coupling structures. In some embodiments, the female fluid connector 1515 includes a receiving aperture 1525 sized and shaped to receive a tube 1530 of the male fluid connector 1520. The connection can include releasable locking features 1535 (which can be actuated by one or more solenoids 1527) positioned to selectively hold and release the male connector 1520 in the aperture 1525 of the female connector 1515. When connected, fluid can flow through the tube 1530 and an inlet and/or outlet 1540 of the female connector 1515.

Figure 15F:
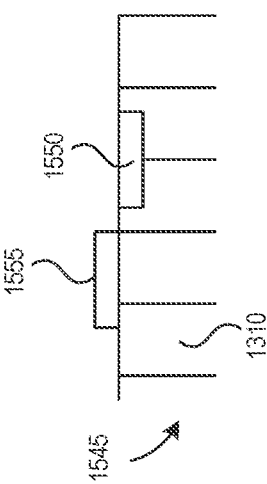

FIG. 15D illustrates a magnetic coupling 1545, which can include a male connector 1550 (which can be an actuated magnet that can be turned on or off) and a female connector 1555, which can be a metallic pad susceptible to magnetic forces. FIG. 15E illustrates mechanical alignment features (see elements 1345 and 1350 in FIG. 13 above), which can include a female mechanical alignment feature in the form of a cup 1560 to receive a male alignment feature in the form of a projection or cone 1565, for example. FIG. 15F illustrates electrical connectors 1570, each of which can include a spring 1575 positioned in a recess 1580 and biasing a contact 1585 outwardly from the mounting element 1310. In some embodiments, a contact 1585 can be a flat pad positioned to contact another contact 1585 of another connector 1570 on another coupling structure. In some embodiments, the contact 1585 can include a point or a cone or another protrusion. In some embodiments, contacts 1585 can make contact with a non-spring loaded female contact pad 1590 on the opposing coupling structure.

Connectors and coupling structures according to the present technology can be arranged in any suitable manner to provide androgynous coupling between spacecraft to transfer fluids, electrical signals, mechanical forces, data, heat, and/or any other suitable transferrable material.

D. Material Transportation, Distribution, and/or Sale

In some embodiments, spacecraft according to embodiments of the present technology can operate in one or more orbits around the Earth or the Moon, or around other celestial locations, or they may operate on surfaces of extraterrestrial bodies (e.g., the Moon, Mars, asteroids). For example, spacecraft can operate in a low inclination orbit (for example, between 3 and 13 degrees, such as 8 degrees) around Earth to rendezvous with spacecraft launched from near the equator, such as from French Guiana, India, or Brazil. In some embodiments, spacecraft can operate in a medium inclination orbit (for example, between 25 to 35 degrees, such as 30 degrees) to rendezvous with spacecraft launched from Florida, California, Japan, or China. In yet further embodiments, spacecraft can operate in high inclination orbit, (for example, between 41 and 51 degrees, such as 46 degrees) to rendezvous with spacecraft launched from Russia or Alaska. In another embodiment, spacecraft can operate in sun synchronous orbit (SSO), for example, inclined at 98 degrees for proximity to common Earth observation orbits. In some embodiments, orbits can be Low Earth Orbit (LEO), Medium Earth Orbit (MEO), Geostationary Earth Orbit (GEO), or a Super-Synchronous Earth Orbit (SSEO) with a period greater than 24 hours. Orbits can be eccentric (such as a transfer orbit). Spacecraft can be positioned at or near one or more of the Lagrangian points in a two-body system, such as the Lagrangian points associated with the Earth and the Moon. In some embodiments, spacecraft can be positioned in a lunar orbit.

In some embodiments, a spacecraft (for example, a tanker) with a container can dock with another spacecraft (such as a satellite) using coupling structures (which can be androgynous as disclosed herein). A controller or other operator can cause material to be transferred between the two spacecraft. For example, the satellite can deploy a flexible container and the tanker can fill the flexible container with fuel or other material. Then, the tanker can undock and move to another orbit. Accordingly, the present technology facilitates distribution of materials such as fuel, which can be implemented in a commercial fuel or material selling process. In some embodiments, a spacecraft (such as a tanker) including a storage container having fuel or other material can be launched to a first orbit, where it can be stored or parked. That first orbit can be a high parking orbit. The tanker can be transferred to a second orbit, which can be an operational orbit for a satellite. The tanker can dock with the satellite and provide fuel to the satellite. The tanker can then undock from the satellite and return to the parking orbit. Accordingly, the tanker can be stored in a low drag environment, and/or in an orbit that poses low impact risk to other operational spacecraft until it is needed, and the satellite can be refueled when needed. In some embodiments, a tanker can function as a space tug to dock with client satellites and move them to various orbits while using fuel in the tanker or while providing fuel to the client satellite.

Figure 16:
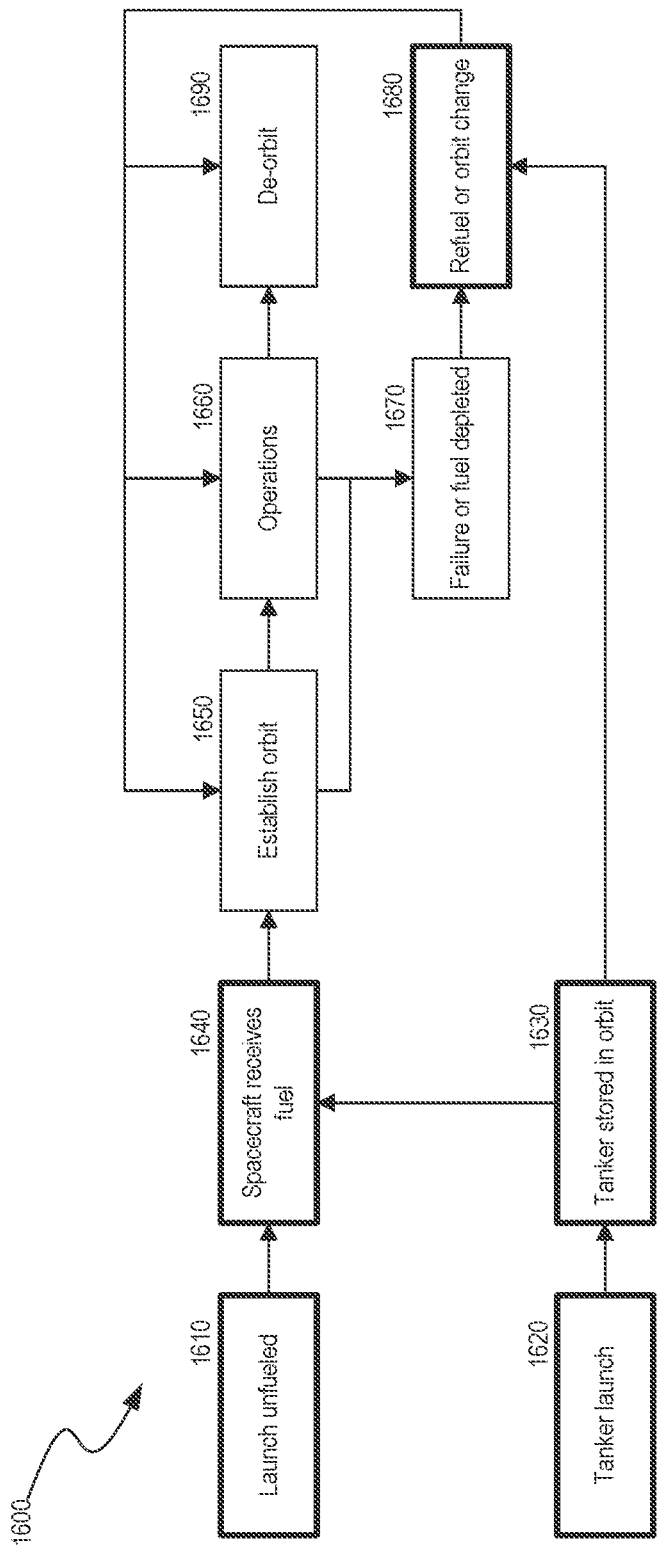
FIGS. 16 and 17 illustrate flow diagrams of representative methods for delivering and storing materials in space.

FIG. 16 illustrates a flow diagram of a method 1600 of transferring, delivering, and/or storing materials in space, or otherwise conducting a space mission. In block 1610, a spacecraft such as a satellite can be launched unfueled or without sufficient fuel to carry out its mission. In block 1620, a spacecraft such as a tanker carrying fuel can be launched, and in block 1630 it can be stored in an orbit, until it is moved to or otherwise meets the satellite to fuel the satellite, as shown in block 1640. In block 1650, the satellite can establish its orbit (or re-establish orbit after receiving fuel). In block 1660, the satellite can carry out its mission or other operations. In block 1670, the fuel in the satellite can be depleted. In block 1680, the satellite can be refueled by the tanker (for example, by the tanker changing orbits to rendezvous with the satellite, or by the satellite changing orbits to rendezvous with the tanker). In block 1690, the satellite and/or tanker mission can be complete after one or more fueling or refueling operations, and the satellite and/or tanker can be deorbited (e.g., entered into Earth's atmosphere or placed in a "graveyard" orbit or other suitable orbit). In some embodiments, the satellite can deploy a flexible container upon arriving at its operational orbit, or upon docking with the tanker (for example, to prepare to receive material from the tanker). By this process, for example, a single tanker can provide fuel to multiple satellites, and/or a single satellite can receive fuel from multiple tankers.

Figure 17:
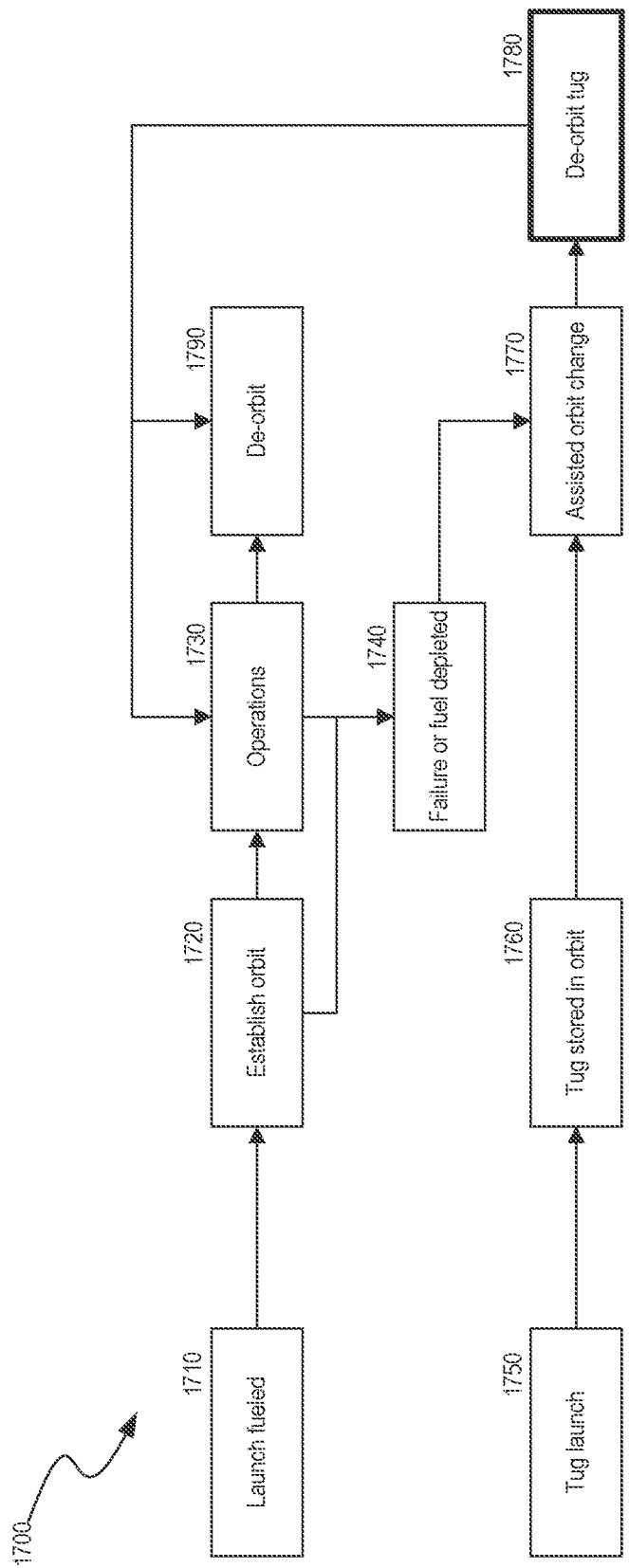

FIG. 17 illustrates a flow diagram of a method 1700 of carrying out a space mission in accordance with another embodiment of the present technology. In block 1710, a satellite can be launched fully fueled, and in block 1720, it can establish its orbit. In block 1730, the satellite can carry out its mission or other operations, during or after which it can require refueling or orbit change, in block 1740. Simultaneously or at another time a tug (which can be a tanker according to the technology herein), can be launched (block 1750) and stored in an orbit (block 1760). In block 1770, the tug or tanker can carry out an assisted orbit change of the satellite and/or a refueling operation. The tug or tanker can use its own propulsion systems or the propulsion systems of the satellite. In blocks 1780 and 1790, missions can be complete and the tug or tanker and the satellite can deorbit. In some embodiments, the tug can carry out multiple tug or refuel operations before being deorbited.

The present technology contemplates other processes and methods. For example, in some embodiments, after an assisted orbit change (block 1770), the satellite can carry out its operations (block 1730), the satellite can deorbit (block 1790), the tug can deorbit (block 1780), and/or the tug can return to a storage orbit (block 1760). Any suitable refueling and/or tugging process may be accomplished with embodiments of the present technology.

A storage or parking orbit for a tanker can be the same as or different than (e.g., smaller than or larger than) an operational orbit for a satellite. For example, the parking orbit can have a larger semi-major and/or semi-minor axis than the satellite operational orbit. Orbits can be elliptical, circular, and/or transfer orbits between bodies.

Embodiments of the present technology provide facilities and equipment that enable fluid and material transfer and/or processing operations in extraterrestrial environments, such as in orbit or on a planetary or lunar surface. In some embodiments, activities of spacecraft and related equipment described herein can be controlled by an on-board human, remotely, or autonomously. In some embodiments, artificial intelligence (AI) can be implemented to automatically communicate between spacecraft to determine fueling needs and to control refueling operations disclosed herein. AI can be implemented to control formation flying of spacecraft or docking and undocking of spacecraft to form large or small aggregate spacecraft.

Embodiments of the present technology can be commercialized to provide a refueling and/or tug service to improve satellite or other space mission capabilities and/or to improve the usable lifetime of spacecraft. In some embodiments, the tankers can retrieve and process materials from satellites (which can include fuel tanks or other tanks in upper stages of launch vehicles), or from other sources, for later delivery to other spacecraft. For example, tankers and spacecraft according to the present technology can retrieve unused liquid hydrogen and liquid oxygen from a rocket upper stage, convert it to water, store it as propellant, or otherwise store and distribute it.

From the foregoing, it will be appreciated that some embodiments of the present technology have been described herein for purposes of illustration, but various modifications may be made without deviating from the disclosed technology. For example, any suitable material can be transferred with the present technology, and activities can be performed in any suitable orbit. Spacecraft can be sized and configured to have any features suitable for space missions. In addition, certain aspects of the technology described in the context of some embodiments may be combined or eliminated in some embodiments. For example, embodiments need not include every system or subsystem disclosed herein. Various embodiments can be assembled on orbit or on Earth. Structures can be 3D-printed, welded, or assembled in other suitable ways. In some embodiments, otherwise unused space on a launch vehicle can be filled with fuel or carry a container according to an embodiment of the present technology. In some embodiments, stores or banks of material in space may be created or increased by bringing fuel or other material in the unused space of a launch vehicle, and/or by bringing one or more containers of fuel into orbit. In some embodiments, a structure around or in flexible containers can include a shape memory alloy that applies pressure to the flexible containers to function as an expulsion device to push material out of the flexible containers. Although containers (including flexible containers) have been illustrated as round, they can have any suitable shape.

Further, while advantages associated with some embodiments of the technology have been described in the context of those embodiments, some embodiments may also exhibit said advantages, and not all embodiments need necessarily exhibit such advantages to fall within the scope of the present technology. Accordingly, the present disclosure and associated technology can encompass other embodiments not expressly described or shown herein.

As used herein, the term "and/or" when used in the phrase "A and/or B" means "A, or B, or both A and B." A similar manner of interpretation applies to the term "and/or" when used in a list of more than two terms.

To the extent any of the materials incorporated herein by reference conflict with the present disclosure, the present disclosure controls.

I claim:

1. A method of transferring material, power, and data in space, the method comprising:
   launching a first spacecraft comprising a storage container;
   positioning the first spacecraft in an orbit;
   docking the first spacecraft with a second spacecraft in the orbit;
   deploying a deployable container on the second spacecraft;
   transferring material between the storage container and the second spacecraft;
   transferring power between the first spacecraft and the second spacecraft;
   transferring data between the first spacecraft and the second spacecraft; and
   undocking the first spacecraft from the second spacecraft;
   wherein transferring material between the storage container and the second spacecraft comprises receiving material in the deployable container.

2. The method of claim 1, wherein the orbit is a second orbit and the method further comprises:
- transferring the first spacecraft to the second orbit from a first orbit prior to docking the first spacecraft with the second spacecraft; and
- returning the first spacecraft to the first orbit after transferring material between the storage container and the second spacecraft.

3. The method of claim 1, wherein the deployable container is flexible.

4. The method of claim 1, wherein transferring material between the storage container and the second spacecraft comprises receiving, in the storage container, material from the second spacecraft.

5. The method of claim 4, wherein receiving material from the second spacecraft comprises receiving propellant from the second spacecraft.

6. The method of claim 1, wherein transferring material between the storage container and the second spacecraft comprises transferring propellant to the second spacecraft.

7. The method of claim 1, further comprising launching the second spacecraft to the orbit without sufficient fuel for a space mission planned for the second spacecraft.

8. A system for carrying out a space mission, the system comprising:
- a first spacecraft;
- a deployable container carried by the first spacecraft and configured to deploy from a stowed configuration;
- a second spacecraft, wherein the second spacecraft comprises (a) a storage container configured to contain material, and (b) a coupling structure carried on an exterior surface of the second spacecraft; and
- one or more controllers programmed with instructions that, when executed:
  - dock the second spacecraft with the first spacecraft in an orbit using the coupling structure;
  - deploy the deployable container;
  - transfer material between the storage container and the deployable container via the coupling structure; and
  - undock the second spacecraft from the first spacecraft;
- wherein the coupling structure comprises a plurality of connectors including a fluid connector and one or more of an electrical connector, a signal connector, or a mechanical connector positioned to couple the coupling structure with the first spacecraft.

9. The system of claim 8, wherein the orbit is a first orbit and the one or more controllers are programmed with instructions that, when executed:
- transfer the second spacecraft to the first orbit from a second orbit; and
- after undocking the second spacecraft from the first spacecraft, cause the second spacecraft to leave the first orbit.

10. The system of claim 9, wherein the one or more controllers are further programmed with instructions that, when executed, deploy the deployable container after the second spacecraft is transferred to the first orbit.

11. The system of claim 8, wherein transferring material comprises transferring propellant to the deployable container.

12. The system of claim 8, wherein transferring material comprises transferring propellant from the deployable container.

13. The system of claim 8, wherein the deployable container is a flexible container comprising an inner flexible bladder positioned within an outer flexible bladder.

14. The system of claim 13, wherein the inner flexible bladder is positioned to expand within the outer flexible bladder to expel materials from the outer flexible bladder.

* * * * *